(12) United States Patent
Tourapis et al.

(10) Patent No.: US 11,202,078 B2
(45) Date of Patent: Dec. 14, 2021

(54) DYNAMIC POINT CLOUD COMPRESSION USING INTER-PREDICTION

(71) Applicant: Apple Inc., Cupertino, CA (US)

(72) Inventors: Alexandros Tourapis, Los Gatos, CA (US); Jungsun Kim, San Jose, CA (US); Khaled Mammou, Vancouver (CA); Liviu Traian Christian Tulvan, Evry (FR); Marius Preda, Evry (FR)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 17/031,782

(22) Filed: Sep. 24, 2020

(65) Prior Publication Data

US 2021/0099711 A1    Apr. 1, 2021

Related U.S. Application Data

(60) Provisional application No. 62/964,050, filed on Jan. 21, 2020, provisional application No. 62/907,394, filed on Sep. 27, 2019.

(51) Int. Cl.
*H04N 19/139* (2014.01)
*H04N 19/107* (2014.01)
(Continued)

(52) U.S. Cl.
CPC .............. *H04N 19/139* (2014.11); *G06T 9/00* (2013.01); *H04N 19/107* (2014.11);
(Continued)

(58) Field of Classification Search
CPC .. H04N 19/139; H04N 19/147; H04N 19/107; H04N 19/96; H04N 19/172; G06T 9/00
See application file for complete search history.

(56) References Cited

U.S. PATENT DOCUMENTS 8,884,953 B2    11/2014    Chen et al.
9,064,311 B2    6/2015    Mammou et al.
(Continued)

FOREIGN PATENT DOCUMENTS

EP    2533213    12/2012

OTHER PUBLICATIONS

Sebastian Schwarz, et al., "Emerging MPEG Standards for Point Cloud Compression", IEEE Journal on Emerging and Selected Topics in Circuits and Systems, vol. 9, No. 1, Mar. 2019, pp. 133-148.
(Continued)

*Primary Examiner* — Tracy Y. Li
(74) *Attorney, Agent, or Firm* — Robert C. Kowert; Kowert, Hood, Munyon, Rankin & Goetzel, P.C.

(57) ABSTRACT

A system comprises an encoder configured to compress attribute information for a dynamic point cloud and/or a decoder configured to decompress compressed attribute information for a dynamic point cloud. The dynamic point cloud may include multiple versions of the point cloud at multiple moments in time Attribute values for the point cloud may be compressed at a reference frame using an intra-prediction process and may be compressed at one or more reference frames using an inter-prediction process that takes advantage of temporal relationships between different frames (e.g. versions) of the dynamic point cloud at the different moments in time.

19 Claims, 17 Drawing Sheets

(51) Int. Cl.
*G06T 9/00* (2006.01)
*H04N 19/96* (2014.01)
*H04N 19/147* (2014.01)
*H04N 19/172* (2014.01)

(52) U.S. Cl.
CPC .......... *H04N 19/147* (2014.11); *H04N 19/96* (2014.11); *H04N 19/172* (2014.11)

(56) References Cited

U.S. PATENT DOCUMENTS

| | | |
|---|---|---|
| 9,171,383 B2 | 10/2015 | Ahn et al. |
| 10,762,667 B2 | 9/2020 | Mekuria |
| 2006/0133508 A1* | 6/2006 | Sekiguchi .............. H04N 19/53 375/240.17 |
| 2009/0285301 A1* | 11/2009 | Kurata ................. H04N 19/527 375/240.16 |
| 2013/0195352 A1* | 8/2013 | Nystad ................. H04N 19/197 382/166 |
| 2017/0214943 A1* | 7/2017 | Cohen ................. H04N 19/136 |
| 2017/0347122 A1* | 11/2017 | Chou .................... H04N 19/36 |
| 2018/0268570 A1 | 9/2018 | Budagavi et al. |
| 2019/0087979 A1 | 3/2019 | Mammou et al. |
| 2019/0197739 A1 | 6/2019 | Sinharoy et al. |
| 2020/0005518 A1 | 1/2020 | Graziosi |
| 2020/0153885 A1 | 5/2020 | Lee et al. |
| 2020/0219285 A1 | 7/2020 | Faramarzi et al. |
| 2020/0286261 A1 | 9/2020 | Faramarzi et al. |
| 2020/0302578 A1 | 9/2020 | Graziosi |

OTHER PUBLICATIONS

Li Li, et al., Efficient Projected Frame Padding for Video-based Point Cloud Compression, IEEE Transactions on Multimedia, doi: 10.100/TMM.2020.3016894, 2020, pp. 1-14.
Lujia Wang, et al., "Point-cloud Compression Using Data Independent Method—A 3D Discrete Cosine Transform Approach", in Proceedings of the 2017 IEEE International Conference on Information and Automation (ICIA), Jul. 2017, pp. 1-6.
Ismael Daribo, et al., "Efficient Rate-Distortion Compression on Dynamic Point Cloud for Grid-Pattern-Based 3D Scanning Systems", 3D Research 3.1, Springer, 2012, pp. 1-9.
Yiting Shao, et al., "Attribute Compression of 3D Point Clouds Using Laplacian Sparsity Optimized Graph Transform", 2017 IEEE Visual Communications and Image Processing (VCIP), IEEE, 2017, p. 1-4.
Siheng Chen, et al., "Fast Resampling of 3D Point Clouds via Graphs", arX1v:1702.06397v1, Feb. 11, 2017, pp. 1-15.
Nahid Sheikhi Pour, "Improvements for Projection-Based Point Cloud Compression", MS Thesis, 2018, pp. 1-75.
Robert Skupin, et al., "Multiview Point Cloud Filtering for Spatiotemporal Consistency", VISAPP 2014—International Conference on Computer Vision Theory and Applications, 2014, pp. 531-538.
International Search Report and Written Opinion from PCT/US/2020052887, dated Dec. 16, 2020, pp. 1-17.
"V-PCC Codec Description", 127. MPEG Meeting; Jul. 8, 2019-Jul. 12, 2019; Gothenburg; (Motion Picture Expert Group or ISO/IEC JTC1/SC29/WG), dated Sep. 25, 2019.
G-PPC Codec Description, 127. MPEG Meeting; Jul. 8, 2019-Jul. 12, 2019; Gothenburg; (Motion Picture Expert Group or ISO/IEC JTC1/SC29/WG),dated Sep. 6, 2019.

* cited by examiner

*Compressed Attribute Information File*    400

| |
|---|
| *Configuration Information*    402<br>  K    (Number of nearest neighbors to identify)<br>  C    (Context encoding configuration(s))<br>  AI    (Additional configuration information) |
| *Point Cloud Data*    404<br>*Attribute Information for Starting Points*<br>$(X_A, Y_A, Z_A; A_{1A}, A_{2A}, A_{3A},)$; $(Point\ N, A_{1N}, A_{2N}, A_{3N},)$, ... |
| *Point Attribute Correction Values*    406<br>  Point A            Attribute 1 — +1<br>                      Attribute 2 — −1<br>                      Attribute 3 — 0<br><br>  Point B            Attribute 1 — +2<br>  .                          Attribute 2 — −2<br>  .<br>  . |
| *Block/Segment Motion Compensation Functions*    408<br>  Segment A          Piece-wise rigid motion<br>                              -Motion vector (A,B,C)<br><br>  Segment B          Affine Motion<br>                              -Motion Function XYZ<br><br>  Segment C          Elastic Motion<br>  .                               -Motion Function TUV<br>  .<br>  . |

*FIG. 4*

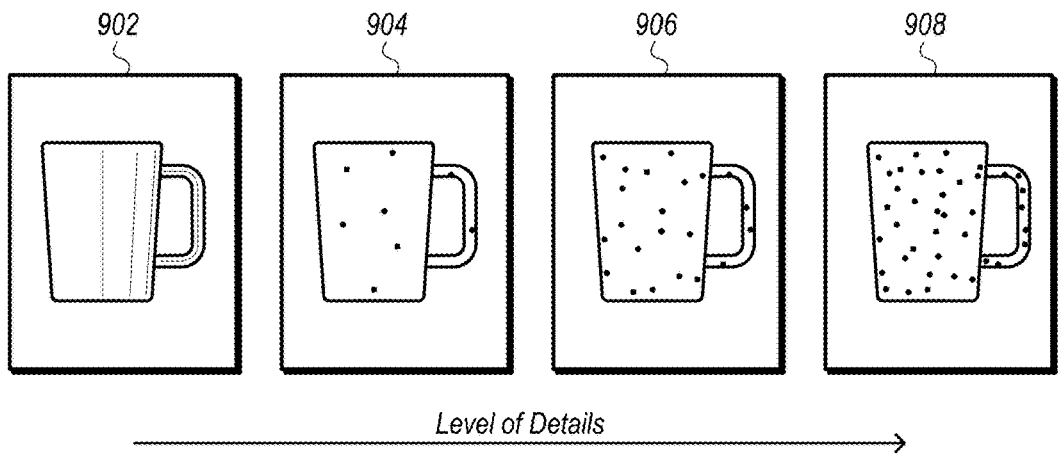

Level of Details

FIG. 9A

Compressed Attribute Information File 950

| Configuration Information | 952 |
| --- | --- |

N (Number of Levels of Detail)
S (Level of Detail Initial Sampling Distance)
F (Sampling Distance Update Factor)
K (Number of nearest neighbors to identify)
C (Context encoding configuration(s))
AI (Additional configuration information)

Point Cloud Data — 954
Attribute Information for Starting Points
$(X_A, Y_A, Z_A; A_{1A}, A_{2A}, A_{3A},); (Point\ N, A_{1N}, A_{2N}, A_{3N},), \ldots$ Point Attribute Correction Values LOD1 — 956
Point A       Attribute 1 — +1
              Attribute 2 — -1
              Attribute 3 — 0

Point B       Attribute 1 — +2
              Attribute 2 — -2

Point Attribute Correction Values LOD2
Point C       Attribute 1 — +2
              Attribute 2 — -3

Point D       Attribute 1 — +1
              Attribute 2 — 0
              Attribute 3 — -2
              ⋮

FIG. 9B

DYNAMIC POINT CLOUD COMPRESSION USING INTER-PREDICTION

PRIORITY CLAIM

This application claims benefit of priority to U.S. Provisional Application Ser. No. 62/907,394, entitled "Dynamic Point Cloud Compression Using Inter-Prediction", filed Sep. 27, 2019, and which is incorporated herein by reference in its entirety. This application also claims benefit of priority to U.S. Provisional Application Ser. No. 62/964,050, entitled "Dynamic Point Cloud Compression Using Inter-Prediction", filed Jan. 21, 2020, and which is incorporated herein by reference in its entirety.

BACKGROUND

Technical Field

This disclosure relates generally to compression and decompression of point clouds comprising a plurality of points, each having associated attribute information.

Description of the Related Art

Various types of sensors, such as light detection and ranging (LIDAR) systems, 3-D-cameras, 3-D scanners, etc. may capture data indicating positions of points in three dimensional space, for example positions in the X, Y, and Z planes. Also, such systems may further capture attribute information in addition to spatial information for the respective points, such as color information (e.g. RGB values), intensity attributes, reflectivity attributes, motion related attributes, modality attributes, or various other attributes. In some circumstances, additional attributes may be assigned to the respective points, such as a time-stamp when the point was captured. Points captured by such sensors may make up a "point cloud" comprising a set of points each having associated spatial information and one or more associated attributes. In some circumstances, a point cloud may include thousands of points, hundreds of thousands of points, millions of points, or even more points. Also, in some circumstances, point clouds may be generated, for example in software, as opposed to being captured by one or more sensors. In either case, such point clouds may include large amounts of data and may be costly and time-consuming to store and transmit.

SUMMARY OF EMBODIMENTS

In some embodiments, instructions for carrying out a process for compressing attribute data for a plurality of points of a point cloud at a first moment in time and at one or more additional moments in time may be implemented in software via program instructions or implemented in hardware via an integrated circuit, such as one or more application specific integrated circuits (ASICs).

To compress the attribute data at the first moment in time, the process instructions include instructions for applying an intra-prediction process at the first moment in time to predict attribute values of the plurality of points at the first moment in time based on predicted or assigned attribute values of neighboring points at the first moment in time. Compressing the attribute data at the first moment in time also includes determining residual differences between the predicted attribute values and actual attribute values of the point cloud at the first moment in time and encoding the determined residual differences for the point cloud at the first moment in time.

To compress the attribute data at the one or more additional moments in time, the process instructions include instructions for applying an inter-prediction process at the one or more additional moments in time. The inter-prediction process includes segmenting the point cloud at the first moment in time (e.g. a reference frame) into a plurality of segments, each segment comprising one or more points of the point cloud in 3D space. The process instructions to compress the attribute data at the one or more additional moments in time further include instructions for determining motion compensation functions to apply to the segments at the first moment in time (e.g. reference frame) to model motion of the points included in the segments at the first moment in time to a target moment in time at one of the one or more additional moments in time (e.g. at a target frame). The process instructions to compress the attribute data at the one or more additional moments in time further include instructions for determining differences between locations of the points determined using the motion compensation functions and actual locations of the points of the point cloud at the target moment in time.

The process instructions to compress the attribute data at the one or more additional moments in time further includes instructions for further segmenting one or more previously segmented segments of the point cloud and repeating the steps of determining motion compensation functions and determining differences in locations. Furthermore, the process instructions to compress the attribute data at the one or more additional moments in time include instructions for continuing to further segment segments and segmented segments of the point cloud and continuing to determine additional motion compensation functions and location differences, until further segmentation fails to improve compression efficiency and/or distortion by more than one or more threshold amounts.

Once segmentation is complete and motion compensation functions have been determined for the point cloud at the one or more additional moments in time, the process instructions include instructions for encoding data indicating the motion compensation functions determined for the segments and data indicating how the point cloud was segmented. The process instructions to compress the attribute data at the one or more additional moments in time further include instructions for predicting attribute values of points of the point cloud at the target moment in time after applying the determined motion compensation functions, wherein the prediction is performed using an intra prediction process using motion compensated points at the target moment in time; instructions for determining residual differences between the predicted attribute values of the motion compensated points at the target moment in time and actual attribute values of the points of the point cloud at the target moment in time; and instructions for encoding the determined residual differences for the target moment in time. In some embodiments, the process instructions may include instructions for encoding the residual differences, the determined motion functions, and the data indicating how the point cloud was segmented at the one or more additional moments in time in a single bitstream, or as sequentially encoded bitstreams.

In some embodiments, a device includes a memory storing program instructions for implementing an inter-prediction process for compressing point cloud data for a point cloud across multiple moments in time, wherein the point cloud comprises a plurality of points in 3D space. The device also includes one or more processors, that are configured to execute the program instructions, wherein executing the program instructions cause the one or more processors to segment a point cloud at a first moment in time into a plurality of segments, each segment comprising one or more points of the point cloud in 3D space; determine motion compensation functions to apply to the segments at the first moment in time to model motion of the points included in the segments at the first moment in time to a target moment in time; and determine differences between locations of the points determined using the motion compensation functions and actual locations of the points of the point cloud at the target moment in time. The program instruction, when executed, also cause the one or more processors to further segment one or more of the segments, determine motion compensation functions for the further segmented one or more segments, and determine location differences for points of the further segmented one or more segments. Additionally, the program instructions, when executed, cause the one or more processors to encode the determined motion compensation functions for the segments and further segmented segments of the point cloud, in response to determining that further segmentation does not improve compression efficiency or reduce distortion by more than one or more threshold amounts.

In some embodiments, instructions for carrying out a process for decompressing compressed attribute data for a plurality of points of a point cloud at a first moment in time and at one or more additional moments in time may be implemented in software via program instructions or implemented in hardware via an integrated circuit, such as one or more application specific integrated circuits (ASICs). The process instructions include instructions for receiving data indicating motion compensation functions for segments of a point cloud; instructions for applying the motion compensation functions to corresponding segments of the point cloud at a reference point in time to estimate locations of the segments at a target point in time, wherein at least some of the segments are larger than other ones of the segments; and instructions for predicting attribute values for points of the point cloud included in the segments at the target point in time based on the estimated locations of the points at the target point in time.

BRIEF DESCRIPTION OF THE DRAWINGS

FIG. 4 illustrates an example compressed attribute file, according to some embodiments.

FIG. 9A illustrates an example level of detail (LOD) structure, according to some embodiments.

FIG. 9B illustrates an example compressed point cloud file comprising level of details for a point cloud (LODs), according to some embodiments.

Figure 1A:
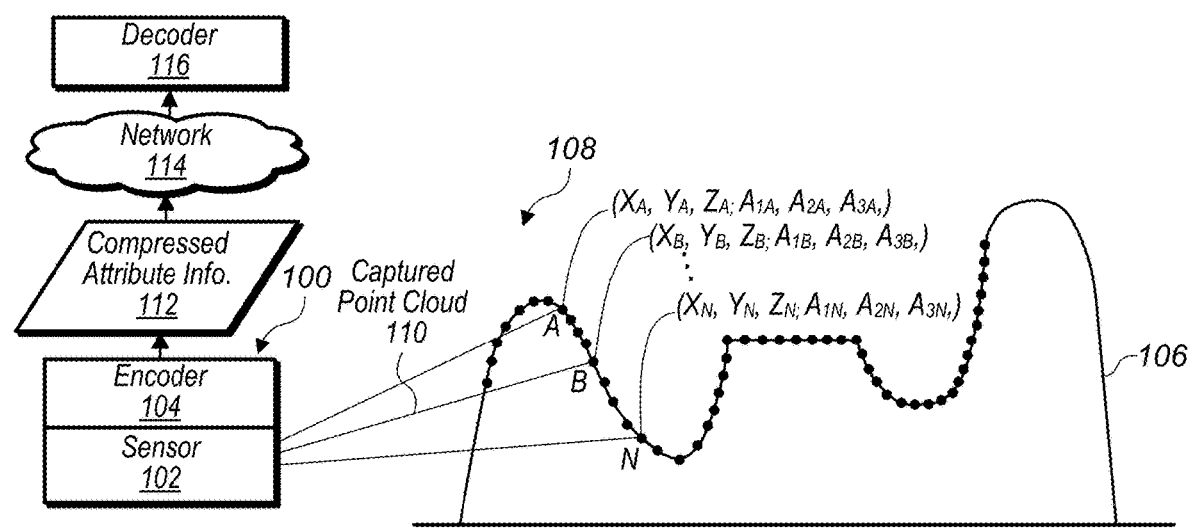
FIG. 1A illustrates a system comprising a sensor that captures information for points of a point cloud and an encoder that compresses attribute information and/or spatial information of the point cloud, where the compressed point cloud information is sent to a decoder, according to some embodiments.

This specification includes references to "one embodiment" or "an embodiment." The appearances of the phrases "in one embodiment" or "in an embodiment" do not necessarily refer to the same embodiment. Particular features, structures, or characteristics may be combined in any suitable manner consistent with this disclosure.

"Comprising." This term is open-ended. As used in the appended claims, this term does not foreclose additional structure or steps. Consider a claim that recites: "An apparatus comprising one or more processor units . . . ." Such a claim does not foreclose the apparatus from including additional components (e.g., a network interface unit, graphics circuitry, etc.).

"Configured To." Various units, circuits, or other components may be described or claimed as "configured to" perform a task or tasks. In such contexts, "configured to" is used to connote structure by indicating that the units/circuits/components include structure (e.g., circuitry) that performs those task or tasks during operation. As such, the unit/circuit/component can be said to be configured to perform the task even when the specified unit/circuit/component is not currently operational (e.g., is not on). The units/circuits/components used with the "configured to" language include hardware—for example, circuits, memory storing program instructions executable to implement the operation, etc. Reciting that a unit/circuit/component is "configured to" perform one or more tasks is expressly intended not to invoke 35 U.S.C. § 112(f), for that unit/ circuit/component. Additionally, "configured to" can include generic structure (e.g., generic circuitry) that is manipulated by software and/or firmware (e.g., an FPGA or a general-purpose processor executing software) to operate in manner that is capable of performing the task(s) at issue. "Configure to" may also include adapting a manufacturing process (e.g., a semiconductor fabrication facility) to fabricate devices (e.g., integrated circuits) that are adapted to implement or perform one or more tasks.

"First," "Second," etc. As used herein, these terms are used as labels for nouns that they precede, and do not imply any type of ordering (e.g., spatial, temporal, logical, etc.). For example, a buffer circuit may be described herein as performing write operations for "first" and "second" values. The terms "first" and "second" do not necessarily imply that the first value must be written before the second value.

"Based On." As used herein, this term is used to describe one or more factors that affect a determination. This term does not foreclose additional factors that may affect a determination. That is, a determination may be solely based on those factors or based, at least in part, on those factors. Consider the phrase "determine A based on B." While in this case, B is a factor that affects the determination of A, such a phrase does not foreclose the determination of A from also being based on C. In other instances, A may be determined based solely on B.

DETAILED DESCRIPTION

As data acquisition and display technologies have become more advanced, the ability to capture point clouds comprising thousands or millions of points in 2-D or 3-D space, such as via LIDAR systems, has increased. Also, the development of advanced display technologies, such as virtual reality or augmented reality systems, has increased potential uses for point clouds. However, point cloud files are often very large and may be costly and time-consuming to store and transmit. For example, communication of point clouds over private or public networks, such as the Internet, may require considerable amounts of time and/or network resources, such that some uses of point cloud data, such as real-time uses, may be limited. Also, storage requirements of point cloud files may consume a significant amount of storage capacity of devices storing the point cloud files, which may also limit potential applications for using point cloud data.

In some embodiments, an encoder may be used to generate a compressed point cloud to reduce costs and time associated with storing and transmitting large point cloud files. In some embodiments, a system may include an encoder that compresses attribute information and/or spatial information (also referred to herein as geometry information) of a point cloud file such that the point cloud file may be stored and transmitted more quickly than non-compressed point clouds and in a manner such that the point cloud file may occupy less storage space than non-compressed point clouds. In some embodiments, compression of spatial information and/or attributes of points in a point cloud may enable a point cloud to be communicated over a network in real-time or in near real-time. For example, a system may include a sensor that captures spatial information and/or attribute information about points in an environment where the sensor is located, wherein the captured points and corresponding attributes make up a point cloud. The system may also include an encoder that compresses the captured point cloud attribute information. The compressed attribute information of the point cloud may be sent over a network in real-time or near real-time to a decoder that decompresses the compressed attribute information of the point cloud. The decompressed point cloud may be further processed, for example to make a control decision based on the surrounding environment at the location of the sensor. The control decision may then be communicated back to a device at or near the location of the sensor, wherein the device receiving the control decision implements the control decision in real-time or near real-time. In some embodiments, the decoder may be associated with an augmented reality system and the decompressed attribute information may be displayed or otherwise used by the augmented reality system. In some embodiments, compressed attribute information for a point cloud may be sent with compressed spatial information for points of the point cloud. In other embodiments, spatial information and attribute information may be separately encoded and/or separately transmitted to a decoder.

In some embodiments, a system may include a decoder that receives one or more point cloud files comprising compressed attribute information via a network from a remote server or other storage device that stores the one or more point cloud files. For example, a 3-D display, a holographic display, or a head-mounted display may be manipulated in real-time or near real-time to show different portions of a virtual world represented by point clouds. In order to update the 3-D display, the holographic display, or the head-mounted display, a system associated with the decoder may request point cloud files from the remote server based on user manipulations of the displays, and the point cloud files may be transmitted from the remote server to the decoder and decoded by the decoder in real-time or near real-time. The displays may then be updated with updated point cloud data responsive to the user manipulations, such as updated point attributes.

In some embodiments, a system, may include one or more LIDAR systems, 3-D cameras, 3-D scanners, etc., and such sensor devices may capture spatial information, such as X, Y, and Z coordinates for points in a view of the sensor devices. In some embodiments, the spatial information may be relative to a local coordinate system or may be relative to a global coordinate system (for example, a Cartesian coordinate system may have a fixed reference point, such as a fixed point on the earth, or may have a non-fixed local reference point, such as a sensor location).

In some embodiments, such sensors may also capture attribute information for one or more points, such as color attributes, reflectivity attributes, velocity attributes, acceleration attributes, time attributes, modalities, and/or various other attributes. In some embodiments, other sensors, in addition to LIDAR systems, 3-D cameras, 3-D scanners, etc., may capture attribute information to be included in a point cloud. For example, in some embodiments, a gyroscope or accelerometer, may capture motion information to be included in a point cloud as an attribute associated with one or more points of the point cloud. For example, a device equipped with a LIDAR system, a 3-D camera, or a 3-D scanner may include the device's direction and speed in a point cloud captured by the LIDAR system, the 3-D camera, or the 3-D scanner. For example, when points in a view of the device are captured they may be included in a point cloud, wherein the point cloud includes the captured points and associated motion information corresponding to a state of the device when the points were captured.

In some embodiments, attribute information may comprise string values, such as different modalities. For example attribute information may include string values indicating a modality such as "walking", "running", "driving", etc. In some embodiments, an encoder may comprise a "string-value" to integer index, wherein certain strings are associated with certain corresponding integer values. In some embodiments, a point cloud may indicate a string value for a point by including an integer associated with the string value as an attribute of the point. The encoder and decoder may both store a common string value to integer index, such that the decoder can determine string values for points based on looking up the integer value of the string attribute of the point in a string value to integer index of the decoder that matches or is similar to the string value to integer index of the encoder.

In some embodiments, an encoder compresses and encodes spatial information of a point cloud to compress the spatial information in addition to compressing attribute information for attributes of the points of the point cloud. For example, to compress spatial information a K-D tree may be generated wherein, respective numbers of points included in each of the cells of the K-D tree are encoded. This sequence of encoded point counts may encode spatial information for points of a point cloud. Also, in some embodiments, a sub-sampling and prediction method may be used to compress and encode spatial information for a point cloud. In some embodiments, the spatial information may be quantized prior to being compressed and encoded. Also, in some embodiments, compression of spatial information may be lossless. Thus, a decoder may be able to determine a same view of the spatial information as an encoder. Also, an encoder may be able to determine a view of the spatial information a decoder will encounter once the compressed spatial information is decoded. Because, both an encoder and decoder may have or be able to recreate the same spatial information for the point cloud, spatial relationships may be used to compress attribute information for the point cloud.

For example, in many point clouds, attribute information between adjacent points or points that are located at relatively short distances from each other may have high levels of correlation between attributes, and thus relatively small differences in point attribute values. For example, proximate points in a point cloud may have relatively small differences in color, when considered relative to points in the point cloud that are further apart.

In some embodiments, an encoder may include a predictor that determines a predicted attribute value of an attribute of a point in a point cloud based on attribute values for similar attributes of neighboring points in the point cloud and based on respective distances between the point being evaluated and the neighboring points. In some embodiments, attribute values of attributes of neighboring points that are closer to a point being evaluated may be given a higher weighting than attribute values of attributes of neighboring points that are further away from the point being evaluated. Also, the encoder may compare a predicted attribute value to an actual attribute value for an attribute of the point in the original point cloud prior to compression. A residual difference, also referred to herein as an "attribute correction value" may be determined based on this comparison. An attribute correction value may be encoded and included in compressed attribute information for the point cloud, wherein a decoder uses the encoded attribute correction value to correct a predicted attribute value for the point, wherein the attribute value is predicted using a same or similar prediction methodology at the decoder that is the same or similar to the prediction methodology that was used at the encoder.

In some embodiments, to encode attribute values an encoder may generate a minimum spanning tree for points of a point cloud based on spatial information for the points of the point cloud. The encoder may select a first point as a starting point and may determine an evaluation order for other ones of the points of the point cloud based on minimum distances from the starting point to a closest neighboring point, and a subsequent minimum distance from the neighboring point to the next closest neighboring point, etc. In this way, an evaluation order for determining predicted attribute values of the points of the point cloud may be determined. Because the decoder may receive or re-create the same spatial information as the spatial information used by the encoder, the decoder may generate the same minimum spanning tree for the point cloud and may determine the same evaluation order for the points of the point cloud.

In some embodiments, an encoder may assign an attribute value for a starting point of a point cloud to be used to generate a minimum spanning tree. An encoder may predict an attribute value for a next nearest point to the starting point based on the attribute value of the starting point and a distance between the starting point and the next nearest point. The encoder may then determine a difference between the predicted attribute value for the next nearest point and the actual attribute value for the next nearest point included in the non-compressed original point cloud. This difference may be encoded in a compressed attribute information file as an attribute correction value for the next nearest point. The encoder may then repeat a similar process for each point in the evaluation order. To predict the attribute value for subsequent points in the evaluation order, the encoder may identify the K-nearest neighboring points to a particular point being evaluated, wherein the identified K-nearest neighboring points have assigned or predicted attribute values. In some embodiments, "K" may be a configurable parameter that is communicated from an encoder to a decoder.

The encoder may determine a distance in X, Y, and Z space between a point being evaluated and each of the identified neighboring points. For example, the encoder may determine respective Euclidian distances from the point being evaluated to each of the neighboring points. The encoder may then predict an attribute value for an attribute of the point being evaluated based on the attribute values of the neighboring points, wherein the attribute values of the neighboring points are weighted according to an inverse of the distances from the point being evaluated to the respective ones of the neighboring points. For example, attribute values of neighboring points that are closer to the point being evaluated may be given more weight than attribute values of neighboring points that are further away from the point being evaluated.

In a similar manner as described for the first neighboring point, the encoder may compare a predicted value for each of the other points of the point cloud to an actual attribute value in an original non-compressed point cloud, for example the captured point cloud. The difference may be encoded as an attribute correction value for an attribute of one of the other points that is being evaluated. In some embodiments, attribute correction values may be encoded in an order in a compressed attribute information file in accordance with the evaluation order determined based on the minimum spanning tree. Because the encoder and the decoder may determine the same evaluation order based on the spatial information for the point cloud, the decoder may determine which attribute correction value corresponds to which attribute of which point based on the order in which the attribute correction values are encoded in the compressed attribute information file. Additionally, the starting point and one or more attribute value(s) of the starting point may be explicitly encoded in a compressed attribute information file such that the decoder may determine the evaluation order starting with the same point as was used to start the evaluation order at the encoder. Additionally, the one or more attribute value(s) of the starting point may provide a value of a neighboring point that a decoder uses to determine a predicted attribute value for a point being evaluated that is a neighboring point to the starting point.

In some embodiments, an encoder may determine a predicted value for an attribute of a point based on temporal considerations. For example, in addition to or in place of determining a predicted value based on neighboring points in a same "frame" e.g. point in time as the point being evaluated, the encoder may consider attribute values of the point in adjacent and subsequent time frames.

In some embodiments, an encoder may encode a reference frame of a dynamic point cloud using any of the techniques as described above. For example, an encoder may compress spatial information and/or attribute information for a reference frame of a dynamic point cloud using. K-D trees, sub-sampling and prediction, nearest neighbor attribute prediction, etc. However, in order to take advantage of temporal relationships, the encoder may utilize an inter-prediction process to encode spatial and/or attribute information for additional frames (e.g. target frames) that have a temporal relationship with the reference frame.

For example, an encoder may, at the encoder, segment the point cloud at the reference frame and determine motion compensation functions for respective segments of the segmented reference frame to model motion of the segments to a target frame (e.g. at one or more additional moments in time). The encoder then perform motion compensation on the points of the reference frame using the determined segments and determined motion compensation functions to yield a motion compensated version of the reference frame that the decoder is likely to encounter when applying the determined segmentation and determined motion compensation functions determined at the encoder. Next, the encoder performs an attribute prediction process for each of the segments, using similar attribute prediction techniques as described above. Also, the encoder determines attribute correction values for the points of each segment using similar techniques as described above, wherein the attribute correction values indicate residual differences between the predicted attribute values, predicted using motion compensated points from the reference frame, and actual attribute values of the point cloud at the target frame.

In some embodiments, the encoder may utilize a rate distortion optimization procedure to determine to what degree to segment the point cloud at the reference frame. For example, further segmentation may reduce distortion, but additional segmentation may increase an amount of data to that needs to be encoded to communicate the determined segmentation and the determined motion functions. This is because more segmentation leads to more segments and more motion functions to encode. In some embodiments, a decision to further segment a reference frame point cloud may be made at a segment-by segment level. For example a RDO decision may be made for each segment as to whether or not the compression efficiency costs associated with further segmentation are offset by improvements in distortion for that particular segment. In some embodiments, different portions of a reference frame point cloud may be segmented to different degrees. For example, for some portions of the reference frame point cloud, additional segmentation may not be justified based on a rate distortion optimization, while for other portions of the reference frame point cloud RDO may justify further segmentation.

FIG. 1A illustrates a system comprising a sensor that captures information for points of a point cloud and an encoder that compresses attribute information of the point cloud, where the compressed attribute information is sent to a decoder, according to some embodiments.

System 100 includes sensor 102 and encoder 104. Sensor 102 captures a point cloud 110 comprising points representing structure 106 in view 108 of sensor 102. For example, in some embodiments, structure 106 may be a mountain range, a building, a sign, an environment surrounding a street, or any other type of structure. In some embodiments, a captured point cloud, such as captured point cloud 110, may include spatial and attribute information for the points included in the point cloud. For example, point A of captured point cloud 110 comprises X, Y, Z coordinates and attributes 1, 2, and 3. In some embodiments, attributes of a point may include attributes such as R, G, B color values, a velocity at the point, an acceleration at the point, a reflectance of the structure at the point, a time stamp indicating when the point was captured, a string-value indicating a modality when the point was captured, for example "walking", or other attributes. The captured point cloud 110 may be provided to encoder 104, wherein encoder 104 generates a compressed version of the point cloud (compressed attribute information 112) that is transmitted via network 114 to decoder 116. In some embodiments, a compressed version of the point cloud, such as compressed attribute information 112, may be included in a common compressed point cloud that also includes compressed spatial information for the points of the point cloud or, in some embodiments, compressed spatial information and compressed attribute information may be communicated as separate files.

In some embodiments, encoder 104 may be integrated with sensor 102. For example, encoder 104 may be implemented in hardware or software included in a sensor device, such as sensor 102. In other embodiments, encoder 104 may be implemented on a separate computing device that is proximate to sensor 102.

Figure 1B:
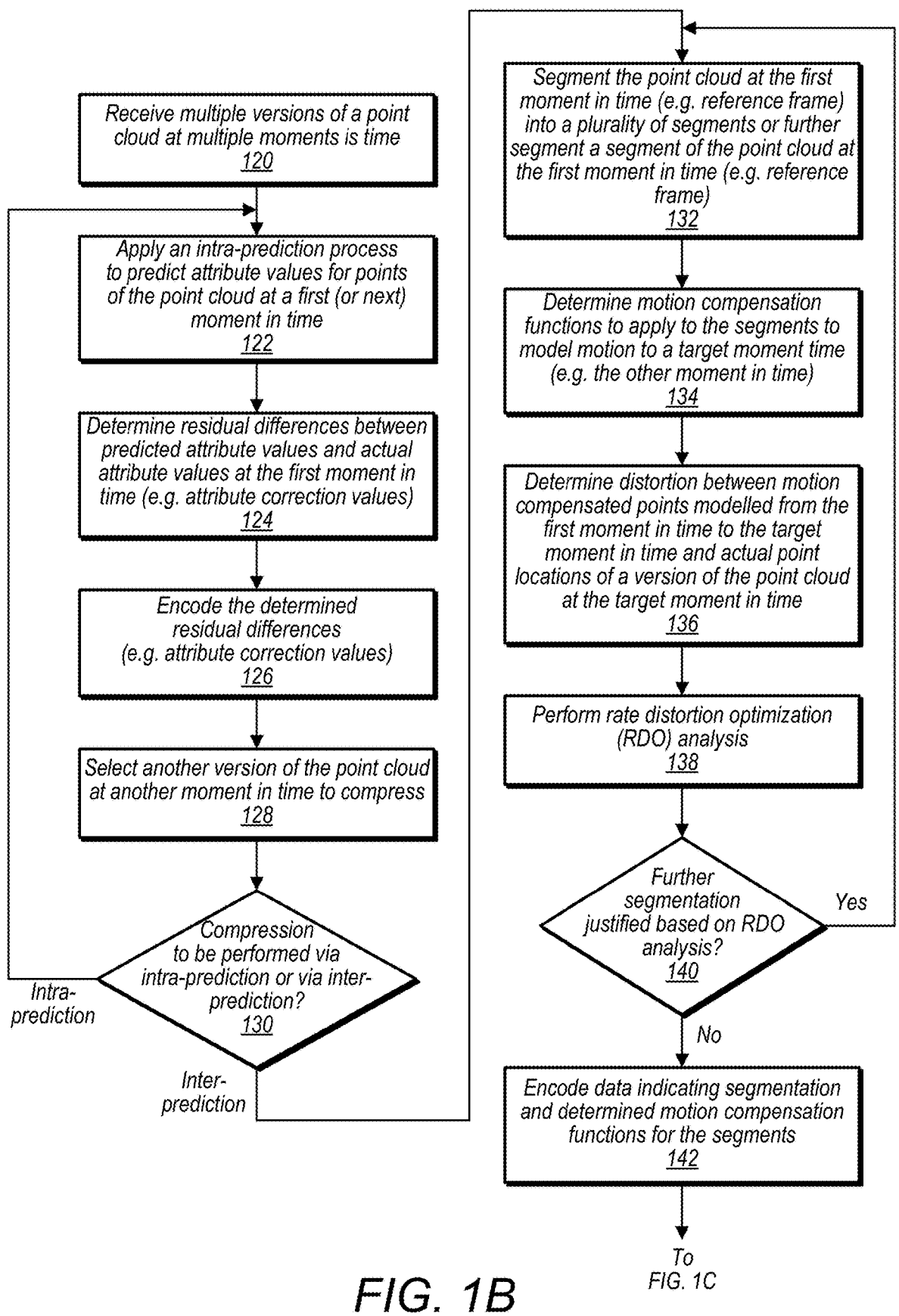
FIG. 1B illustrates a process for encoding attribute information of a dynamic point cloud using both intra-prediction and inter-prediction, according to some embodiments.

FIG. 1B illustrates a process for encoding attribute information of a dynamic point cloud using both intra-prediction and inter-prediction, according to some embodiments.

At 120 an encoder receives multiple versions of a dynamic point cloud at multiple moments in time. For example, each version of the point cloud may represent the dynamic point cloud at respective moments in time, wherein the point cloud moves or changes from one moment in time to another. As used herein a version of the point cloud at a first moment in time may be referred to as a reference frame. Other versions of the point cloud, at earlier or later moments in time than the reference frame, may be referred to herein as target frames. In some embodiments, motion may be estimated from a reference frame to a target frame and the target frame may then be used as a reference frame for estimating motion to another target frame. In some embodiments, motion may be estimated from a single reference frame to multiple target frames at different moments in time.

At 122, the encoder applies an intra-prediction process to predict attribute values for points of the dynamic point cloud at a reference frame. For example, a nearest neighbor prediction process as described herein may be performed. In some embodiments, intra-prediction may be applied to predict all or nearly all the points of a reference frame, and inter-prediction techniques may be used to predict attribute values of subsequent frames or preceding frames that have a temporal relationship with the reference frame. In some embodiments, motion may be estimated for segments of a reference frame, and within the particular segments, a local intra-prediction process may be applied to predict attribute values of motion compensated points within the particular segment.

At 124, residual differences (e.g. attribute correction values) are determined between the predicted attribute values for the reference frame and the actual attribute values for the reference frame as included in the received dynamic point cloud that is being compressed.

At 126, the determined residual differences (e.g. attribute correction values) for the reference frame are encoded. In some embodiments, the determined residual differences may be encoded as a separate bitstream or may be included with data encoded at 142 (discussed below).

At 128, another version of the dynamic point cloud at another moment in a time (e.g. a target frame) is selected to be compressed.

At 130, it is determined whether or not the selected next version of the point cloud at the next moment in time (e.g. the target frame) is to be predicted using an intra-prediction process or an inter-prediction process. For example, the next version of the point cloud at the next moment in time (e.g. the target frame) may be evaluated based on a rate distortion optimization (RDO) procedure to determine whether to encode the next version of the point cloud at the next moment in time (e.g. the target frame) via intra-prediction or inter-prediction. In some embodiments, motion vectors for segments of the point cloud may be determined and if the motion vectors exceed one or more motion thresholds, a decision may be made to encode the next version of the point cloud at the next moment in time (e.g. the target frame) via an intra-prediction process. Whereas, if the motion vectors are less than the one or more thresholds, a decision may be made to encode the next version of the point cloud at the next moment in time (e.g. the target frame) via an inter-prediction process. If intra-prediction is selected, then the process reverts to 122 for the next version of the point cloud at the next moment in time. If inter-prediction is selected, the process continues with 132. In some embodiments, in addition to or in place of motion vectors, compression efficiency, distortion, etc. may be used to determine whether or not to compress the target frame via intra-prediction or inter-prediction.

At 132, the reference frame version of the point cloud (that was compressed in steps 122, 124, and 126) is segmented into a plurality of segments.

At 134, motion compensation functions are determined for the plurality of segments segmented at 132. The motion compensation functions estimate motion of the respective segments from the reference frame to the target frame.

At 136, motion compensated points determined by applying the motion compensation functions determined at 134 to the reference frame segments determined at 132 are compared to points of the dynamic point cloud at the target frame (as included in the versions of the dynamic point cloud received at 120). At 138, a rate distortion optimization analysis is performed for each of the segments based on comparing respective motion compensated points of the segments to the actual point locations in the target frame.

In some embodiments, the motion functions may be iteratively determined using a rate distortion optimization procedure to select a motion compensation function to apply to a given one of the segments. In some embodiments, motion compensation functions may be selected wherein a more simplified motion compensation function is initially tested and a level of distortion is determined. If the distortion exceeds one or more thresholds, a more complex motion compensation function may be tested for the segment. If the tested motion compensation function yields distortion results that are less than the one or more distortion thresholds, the tested motion compensation function may be selected as the selected motion compensation function for the particular segment.

In some embodiments, different motion compensation functions may be applied to different segments of the point cloud at the reference frame to model motion of the respective segments to the target frame. For example, in some embodiments, some segments of the reference frame may move in a way that is best modeled using a rigid motion model (e.g. translation and/or rotation), while motion for other segments of the point cloud at the reference frame may best be modeled using an affine motion transform or an elastic motion transform.

In some embodiments, a rigid-motion motion compensation function may model a segment of a point cloud that translates or rotates but maintains its shape while moving. In some embodiments, an affine motion compensation function may model a segment of a point cloud that contracts, expands, dilates, rotates, shears, translates, or some combination thereof, or undergoes a similar affine motion. For example, a person's leg when walking may be modelled using an affine motion transform to capture contractions and expansions of muscles along with translation and rotation of the person's feet, shins, thighs, etc. An affine-motion motion compensation function may model motion between affine spaces that preserves points, straight lines, and planes, wherein sets of parallel lines remain parallel after applying the affine motion compensation. An affine-motion motion compensation function may not necessarily preserve angles between lines or distances between points (as would be the case for rigid motion), but may otherwise preserve ratios of distances between points lying on a straight line. In some embodiments, an elastic-motion motion compensation function may model motion of a segment of a point cloud that deforms within certain continuity constraints. For example a person wearing a dress may cause the shape of the dress to deform when the person walks within certain continuity constraints such as a stretchiness of the fabric, how the fabric folds over on itself, etc.

In some embodiments, a three dimensional (3D) segmentation method may be used to determine the segments of the dynamic point cloud for which motion models are to be selected, such as an octree segmentation process. In some embodiments, various motion functions may be selected from a set of supported motion functions to best model motion of a given segment of the point cloud. For example, the motion of some segments may be modelled using a rigid-motion motion compensation function that considers translation and rotation of the segment of the point cloud between versions at different moments in time. While other segments may be modelled using more complex motion functions, such as an affine-motion motion compensation function or an elastic-motion motion compensation function. In some embodiments, motion compensation functions for multiple segments of a point cloud may be determined at the same time, e.g. in parallel.

For example, a dynamic point cloud may comprise a person moving his arm, such that it bends at the elbow. In such a situation, the forearm may flex and best be modeled by an affine-motion motion compensation function, whereas the motion of the elbow may best be modeled by a rigid-motion motion compensation function. In some embodiments, an encoder may iteratively test motion compensation functions for segments of a dynamic point cloud at a reference frame to select a motion compensation function to use to model motion of a segment of a point cloud at the reference frame to a target frame. For example, the encoder may first model the motion using a rigid-motion motion compensation function and compute a level of distortion. If the distortion is greater than a threshold, the encoder may then model the motion using a more complex motion transform, such as an affine-motion motion compensation function or an elastic-motion motion compensation function. If the distortion improves by more than a threshold amount, the encoder may select to model the motion of the segment via the more complex motion compensation function. In some embodiments, various other motion compensation functions/motion transforms may be used.

In some embodiments, the point cloud may be segmented into octants of an octree and a motion function may be determined for each lowest level octant. In some embodiments various motion transforms/functions may be used to model the motions of the octants, such as a rigid-motion transform, an affine motion transform, an elastic motion transform, etc. In some embodiments, a rate distortion optimization or similar process may be used to select a degree with which to segment the point cloud, e.g. whether or not to segment the lowest level octants into even smaller octants. Also a rate distortion optimization may be used to select motion transform/compensation functions to be applied to the lowest level octants. In some embodiments, a single RDO (rate distortion optimization) process may take into account both segment size and segment motion transform function selections. In some embodiments, each octant may be encoded as an eight-bit word. In some embodiments, an encoder may solve a linear system to determine a best motion compensation function to use for a segment based on the linear system converging on a local minimum.

At 140, if it is determined that rate distortion optimization (RDO) justifies further segmenting a given segment of the dynamic point cloud at the reference frame, then the given segment to be segmented is further segmented at 132 and the steps of 134, 136, 138, and 140 are performed for the given segment to be further segmented. At 140, if it is determined that further segmentation is not justified for a given segment, then at 142 data indicating the segmentation of the dynamic point cloud that resulted in the given segment (e.g. an eight bit word defining the octant) and data indicating the motion compensation function selected for the given segment is encoded. In some embodiments, data for each segment may be encoded, or in some embodiments data for a group of segments may be encoded together. In some embodiments, the inter-prediction data encoded at 142 may also be encoded in a common bit stream with the intra-prediction data encoded at 126.

In some embodiments, instead of explicitly encoding motion compensation functions for each segment, motion compensation functions may be predicted at both an encoder and decoder based on motion compensation functions of neighboring segments. In such embodiments, an encoder may determine a predicted motion compensation function and may encode residual values to correct the predicted motion compensation function to more closely resemble the motion compensation function determined at 134. In such cases, the encoder may encode motion compensation functions for one or more initial segments and may only encode residual values to be used to correct predicted motion compensation functions for other segments.

In some embodiments, the rate distortion optimization procedures may be solely based on geometry distortions. While in other embodiments, the rate distortion optimization procedures may also take into account attribute distortion, such as texture distortion, color distortion, etc. In some embodiments, in which attributes other than geometry are considered in a rate distortion optimization procedure some, but not all attributes may be considered. For example, a luma color component may be considered, while chroma color components are not considered, as an example.

Figure 1C:
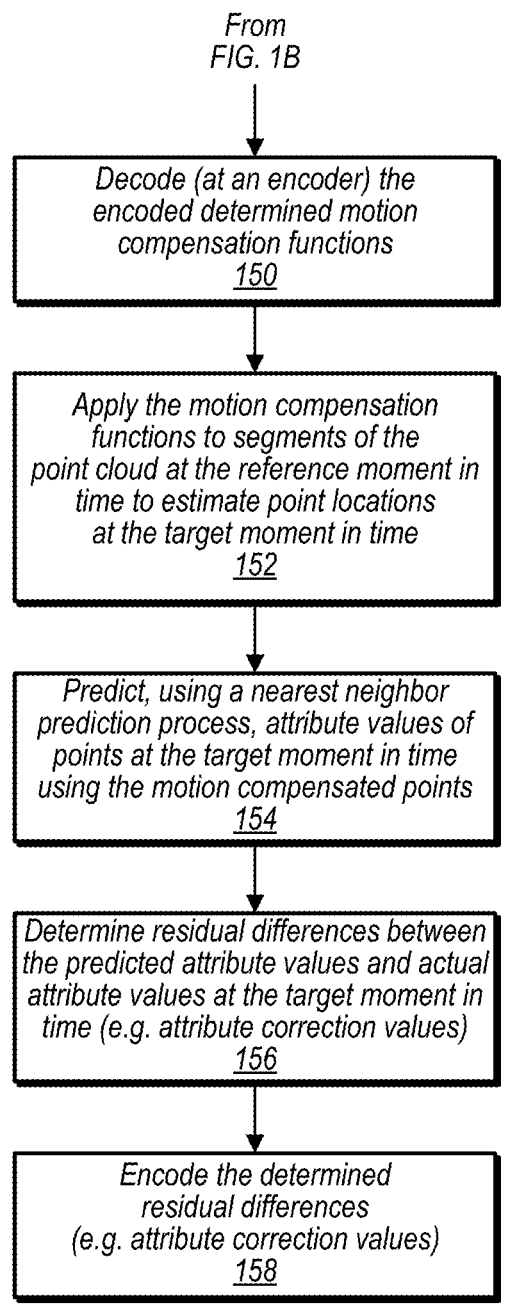
FIG. 1C illustrates additional steps of a process for encoding attribute information of a dynamic point cloud using both intra-prediction and inter-prediction, according to some embodiments.

FIG. 1C illustrates additional steps of a process for encoding attribute information of a dynamic point cloud using both intra-prediction and inter-prediction, according to some embodiments.

At 150, the encoder decodes the encoded determined motion compensation functions and the data indicating the segmentation of the reference frame point cloud to yield the segments that the motion compensation functions correspond to.

At 152, the encoder applies the decoded motion compensation functions to segments determined using the decoded segmentation information for the segments of the reference frame. This results in a modelling of the motion of the dynamic point cloud from the reference frame to the target frame to yield a set of motion compensated points at the target frame that a decoder is likely to model.

At 154, the motion compensation reference frame points compensated to the target frame determined at 152 are used to predict attribute values of the motion compensated points via an intra-prediction process. For example, a K-nearest neighbor intra-prediction process as described herein may be used.

At 156, the predicted attribute values determined at 154 are compared to the actual attribute values of the dynamic point cloud at the target frame and residual differences are determined (e.g. attribute correction values).

At 158, the determined residual differences (e.g. attribute correction values) are encoded. In some embodiments, the residual differences encoded at 158 may be encoded in a common bitstream with the segmentation and motion compensation data encoded at 142 and/or with the intra-prediction data encoded at 126.

In some embodiments, points within each lowest level segment may be organized according to a space filling curve, such as a Morton order. This may be done at both the encoder and the decoder, such that the prediction process is performed in the same order at both the encoder and the decoder. In some embodiments, other point ordering techniques, such as a K-D tree, etc. may be used.

In some embodiments, spatial information for a point cloud may be encoded using an inter-prediction process, while attribute information may be encoded using an intra-prediction process.

In some embodiments, a process for compressing a dynamic point cloud may proceed as follows:

Let T be the target frame to be encoded and R be the reference frame

Let B(R) be the set of points of a frame belonging a block of the motion compensation octree and let B(T) be the associated points of the target frame T associated with the points of B(R). Let A be the transform describing the motion of B(T) (i.e., by applying A to B(R), results in a point close to B(T))

Since the number of points of B(R) and B(T) may be different, each point P in B(R) is associated with N(P) points in B(T), denoted $Q\_0, Q\_i, \ldots, Q\_N(P)-1$ (Note: N(P) could be 0)

The residuals may be computed and encoded as follows:
The points of B(R) are encoded in Morton order
For each point P in B(R)
Encode N(P) with an arithmetic encoder (or any other entropy encoding technique)
For each point Q_i=0 . . . N(P)−1, encode the residual r_i=Q_i−A(P) with an arithmetic encoder (or any other entropy encoding technique)
The residuals may further be predicted by exploiting correlations with previously encoded points
Adaptively (e.g., based on an RDO strategy) choose to predict r_i based on r_i−1, r_i−2, . . . , r_i−M or not applying any residual prediction In some embodiments, a decision to compress via intra-prediction or inter-prediction may be switched based on a rate distortion optimization (RDO) strategy on a frame or segment basis. In some embodiments, additional motion compensation functions such as skinning models may be supported. In some embodiments, more simple motion compensation functions may be used, such as per segment translation.

Figure 1D:
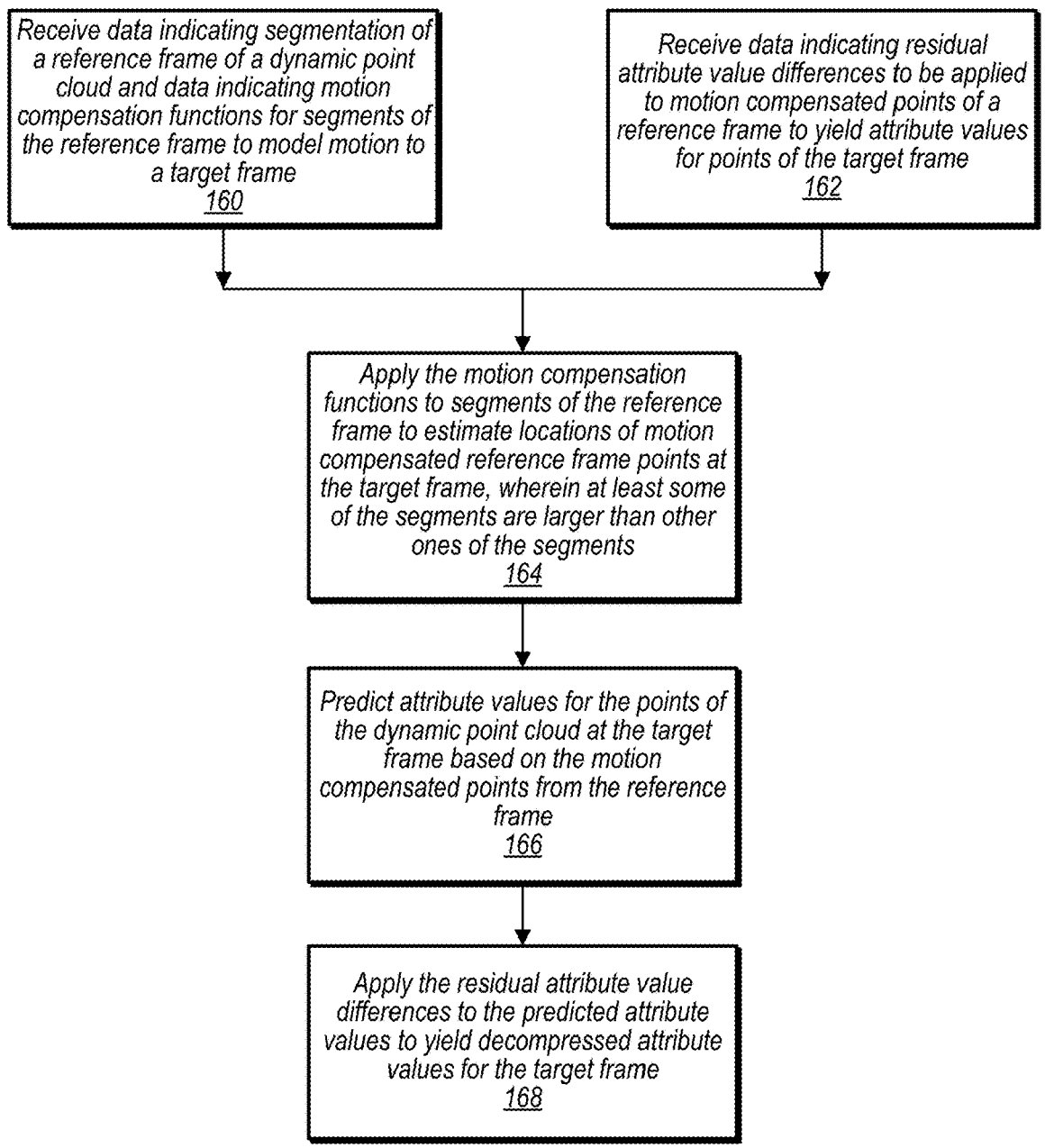
FIG. 1D illustrates a process for decoding attribute information of a dynamic point cloud using both intra-prediction and inter-prediction, according to some embodiments.

FIG. 1D illustrates a process for decoding attribute information of a dynamic point cloud using both intra-prediction and inter-prediction, according to some embodiments.

In some embodiments, a decoder may perform similar processes as were performed at an encoder to decompress compressed dynamic point cloud data and reconstruct a decompressed version of the dynamic point cloud based on an encoded bit stream generated by an encoder, as described above.

At 160, the decoder receives data indicating segmentation of a reference frame of a dynamic point cloud and data indicating motion compensation functions for segments of the reference frame to model motion to a target frame. For example, the decoder may receive data encoded at 142 and 158. Additionally, the decoder may receive data indicating that the target frame is to be decoded using an inter-prediction process. While not shown in FIG. 1D a reference frame or other frame of the dynamic point cloud may be decoded using an intra-prediction process.

At 162, the decoder receives data indicating residual attribute value differences to be applied to motion compensated points of a reference frame to yield attribute values for points of the target frame.

At 164, the decoder applies the motion compensation functions to segments of the reference frame to estimate locations of motion compensated reference frame points at the target frame, wherein at least some of the segments are larger than other ones of the segments. For example the rate distortion optimization procedure used by the encoder may have caused at least one segment to be segmented to a greater degree than other segments of the point cloud at the reference frame.

At 166, the decoder predicts attribute values for the points of the dynamic point cloud at the target frame based on the motion compensated points from the reference frame. For example the decoder may use an intra-prediction process, such as a nearest neighbor prediction procedure, applied to the motion compensated points from the reference frame to predict attribute values for the target frame.

At 168, the decoder applies the residual attribute value differences to the predicted attribute values to yield decompressed attribute values for the target frame.

Figure 2:
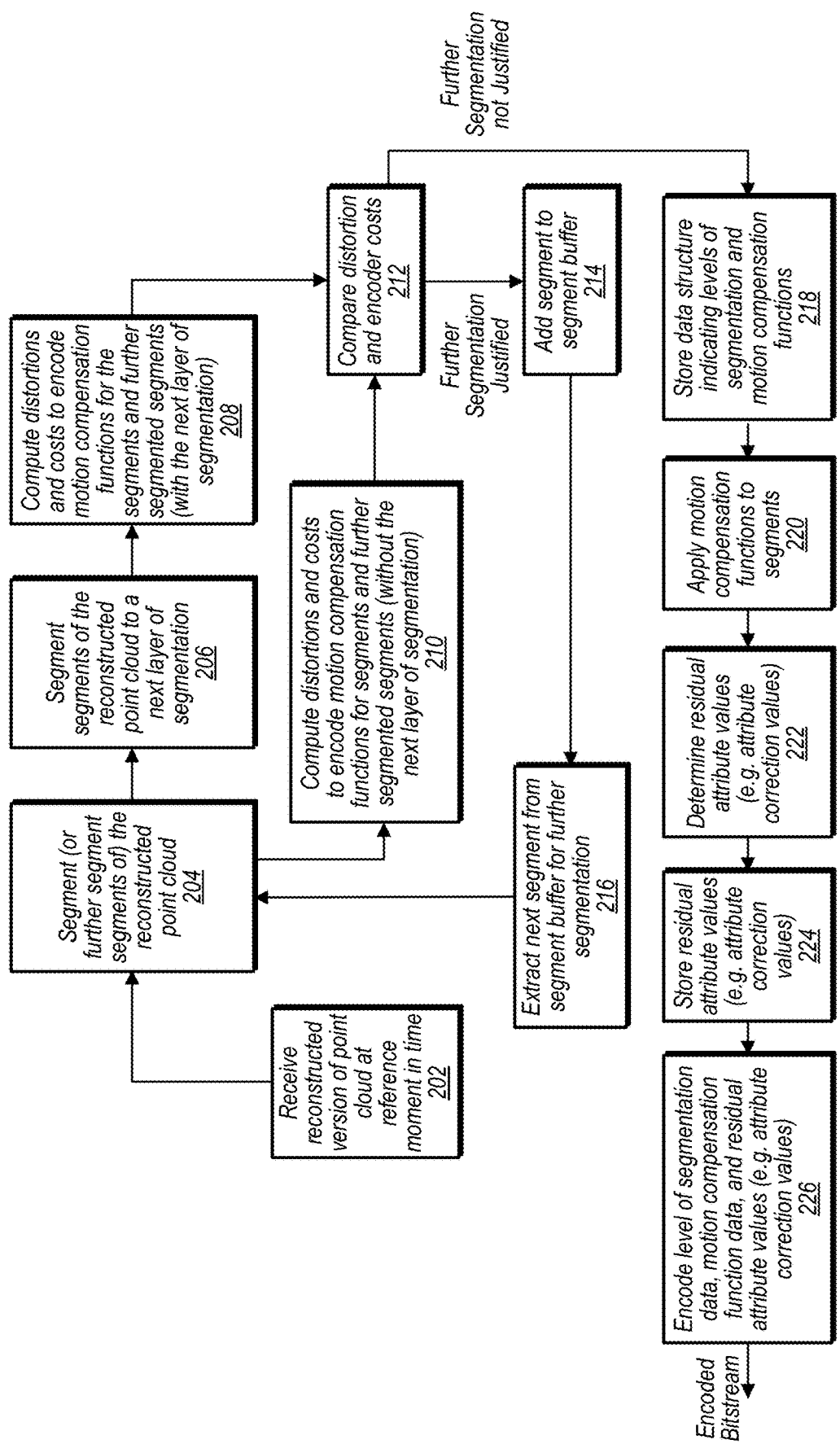
FIG. 2 illustrates additional details regarding an inter-prediction process for compressing attribute data for a dynamic point cloud, according to some embodiments.

FIG. 2 illustrates additional details regarding an inter-prediction process for compressing attribute data for a dynamic point cloud, according to some embodiments.

At 202, an inter-prediction component of an encoder receives a reconstructed version of a dynamic point cloud at a reference moment in time (e.g. reference frame).

At 204, the encoder segments (or further segments) the reconstructed version of the point cloud at the reference moment in time (e.g. reference frame).

At 206, the encoder further segments one or more segments determined at 204.

At 208, the encoder computes compression costs to encode motion compensation functions for the further segmented segments and/or compute improvements in distortion that would result from further segmenting the segments at 206.

At 210, the encoder computes compression costs to encode motion compensation functions without including the further segmented segments of 206. At 210, the encoder also computes distortions that would result without the further segmented segments of 206.

At 212, the encoder compares the distortion improvements that would result from further segmentation to the compression costs that would result from further segmentation and performs a rate distortion optimization (RDO) calculation to determine whether further segmentation is justified. If it is determined that further segmentation is justified for one or more segments, the segments are added to a segment buffer at 214 and extracted from the segment buffer at 216 for further segmentation at 204. The process may repeat until further segmentation is not justified for any of the lowest level segments.

If further segmentation is determined to not be justified at 212, the encoder proceeds to 218 and stores a data structure indicating the determined levels (e.g. degrees) of segmentation and the determined motion compensation functions. Also, at 220 the encoder applies the determined motion compensation functions to the determined segments of the reference frame to determine motion compensated points of the reference frame, compensated to a target frame.

At 222, the encoder predicts attribute values at the target frame using the motion compensated points determined at 220 and determines residual attribute values (e.g. attribute correction values) by comparing the predicted attribute values to the actual attribute values of the dynamic point cloud at the target moment in time (e.g. target frame).

At 224, the encoder stores the determined residual attribute values (e.g. attribute correction values) determined at 222.

At 226, the encoder encodes level of segmentation data, motion compensation function data, and residual attribute values (e.g. attribute correction values) that allow a decoder to determine via an inter-prediction process attribute values at the target frame based on the reference frame.

Figure 3A:
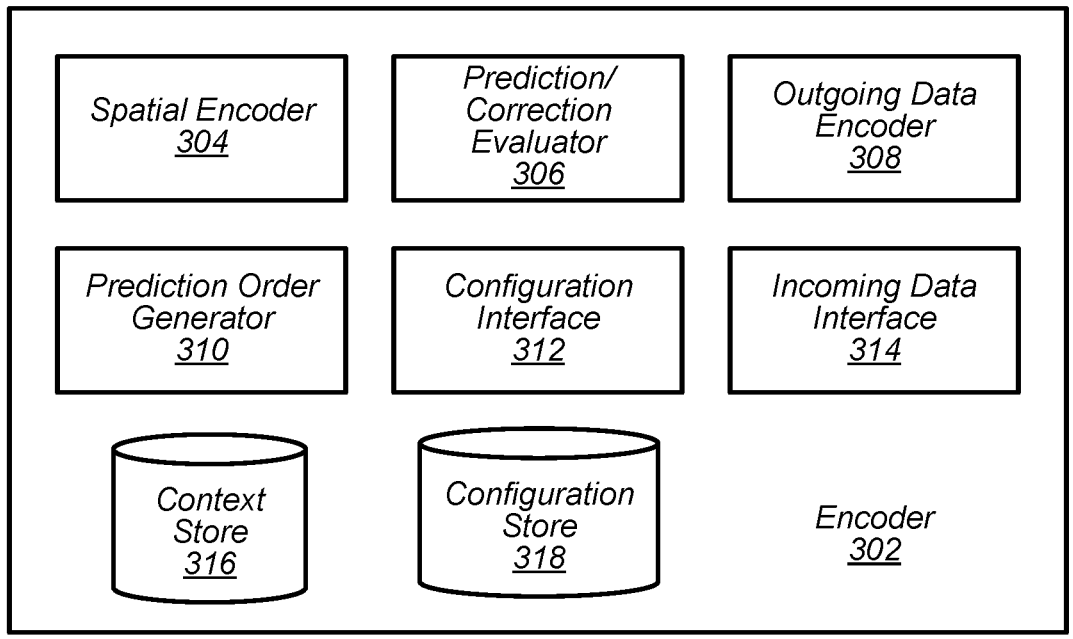
FIG. 3A illustrates components of an encoder, according to some embodiments.

FIG. 3A illustrates components of an encoder, according to some embodiments.

Encoder 302 may be a similar encoder as encoder 104 illustrated in FIG. 1A. Encoder 302 includes spatial encoder 304, prediction order generator 310, prediction/correction evaluator 306, incoming data interface 314, and outgoing data interface 308. Encoder 302 also includes context store 316 and configuration store 318.

In some embodiments, a spatial encoder, such as spatial encoder 304, may compress spatial information associated with points of a point cloud, such that the spatial information can be stored or transmitted in a compressed format. In some embodiments, a spatial encoder, may utilize K-D trees to compress spatial information for points of a point cloud. Also, in some embodiments, a spatial encoder, such as spatial encoder 304, may utilize a sub-sampling and prediction technique. In some embodiments, a spatial encoder, such as spatial encoder 304, may utilize octrees to compress spatial information for points of a point cloud. In some embodiments, a spatial encoder, such as spatial encoder 304, may compress spatial information for a reference frame using any of the spatial compression techniques described herein or may use other spatial compression techniques to compress a reference frame.

In some embodiments, compressed spatial information may be stored or transmitted with compressed attribute information or may be stored or transmitted separately. In either case, a decoder receiving compressed attribute information for points of a point cloud may also receive compressed spatial information for the points of the point cloud, or may otherwise obtain the spatial information for the points of the point cloud. For example, a decoder may receive spatial information for a reference frame of a dynamic point cloud.

A prediction order generator, such as prediction order generator 310, may utilize spatial information for points of a point cloud to generate a space filling curve order, such as a Morton order, for points of a segment used in an inter-prediction process or for a full frame of a point cloud in an intra-prediction process. Because a decoder is provided or otherwise obtains the same spatial information for points of a point cloud as are available at the encoder, a prediction order determined by a prediction order generator of an encoder, such as prediction order generator 310 of encoder 302, may be the same or similar as a prediction order generated by a prediction order generator of a decoder, such as prediction order generator 328 of decoder 320.

A prediction/correction evaluator, such as prediction/correction evaluator 306 of encoder 302, may determine predicted attribute values for points of a point cloud, or points of a segment, based on an inverse distance interpolation method using attribute values of the K-nearest neighboring points of a point for whom an attribute value is being predicted (also referred to herein as a nearest neighbor prediction technique). The prediction/correction evaluator may also compare a predicted attribute value of a point being evaluated to an original attribute value of the point in a non-compressed point cloud to determine an attribute correction value.

An outgoing data encoder, such as outgoing data encoder 308 of encoder 302, may encode segmentation data, motion function data, attribute correction values and assigned attribute values included in a compressed attribute information file for a point cloud. In some embodiments, an outgoing data encoder, such as outgoing data encoder 308, may select an encoding context for encoding a value, such as an assigned attribute value or an attribute correction value, based on a number of symbols included in the value. In some embodiments, values with more symbols may be encoded using an encoding context comprising Golomb exponential encoding, whereas values with fewer symbols may be encoded using arithmetic encoding. In some embodiments, encoding contexts may include more than one encoding technique. For example, a portion of a value may be encoded using arithmetic encoding while another portion of the value may be encoded using Golomb exponential encoding. In some embodiments, an encoder, such as encoder 302, may include a context store, such as context store 316, that stores encoding contexts used by an outgoing data encoder, such as outgoing data encoder 308, to encode attribute correction values and assigned attribute values.

In some embodiments, an encoder, such as encoder 302, may also include an incoming data interface, such as incoming data interface 314. In some embodiments, an encoder may receive incoming data from one or more sensors that capture points of a point cloud or that capture attribute information to be associated with points of a point cloud. For example, in some embodiments, an encoder may receive data from an LIDAR system, 3-D-camera, 3-D scanner, etc. and may also receive data from other sensors, such as a gyroscope, accelerometer, etc. Additionally, an encoder may receive other data such as a current time from a system clock, etc. In some embodiments, such different types of data may be received by an encoder via an incoming data interface, such as incoming data interface 314 of encoder 302.

In some embodiments, an encoder, such as encoder 302, may further include a configuration interface, such as configuration interface 312, wherein one or more parameters used by the encoder to compress a point cloud may be adjusted via the configuration interface. In some embodiments, a configuration interface, such as configuration interface 312, may be a programmatic interface, such as an API. Configurations used by an encoder, such as encoder 302, may be stored in a configuration store, such as configuration store 318.

In some embodiments, an encoder, such as encoder 302, may include more or fewer components than shown in FIG. 3A.

Figure 3B:
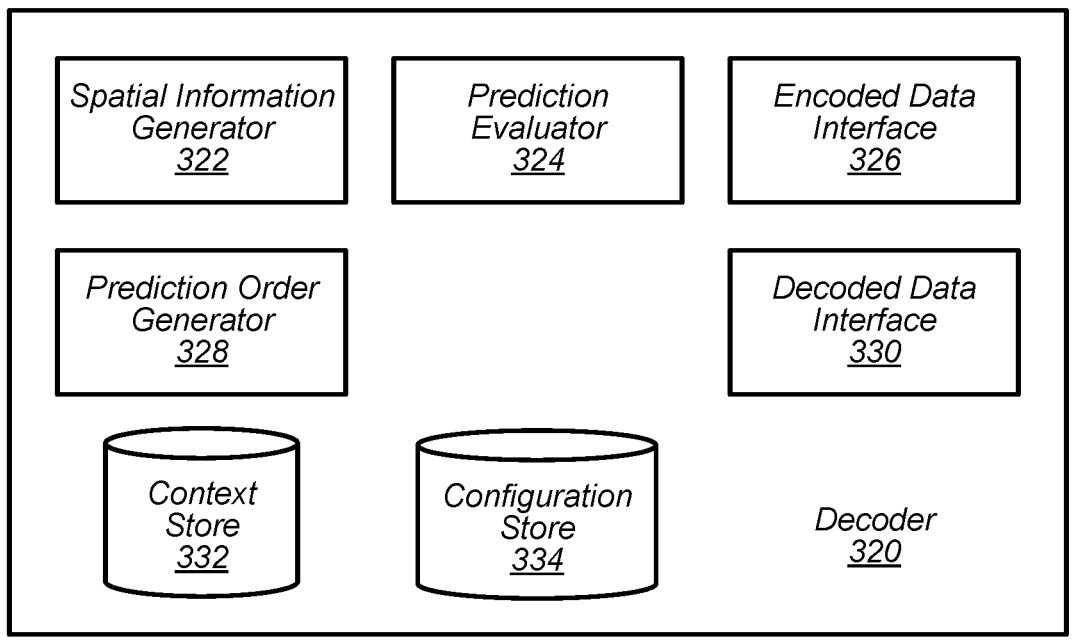
FIG. 3B illustrates components of a decoder, according to some embodiments.

FIG. 3B illustrates components of a decoder, according to some embodiments.

Decoder 320 may be a similar decoder as decoder 116 illustrated in FIG. 1A. Decoder 320 includes encoded data interface 326, spatial information generator 322, prediction order generator 328, prediction evaluator 324, context store 332, configuration store 334, and decoded data interface 320.

A decoder, such as decoder 320, may receive an encoded compressed point cloud and/or an encoded compressed attribute information file for points of a point cloud. For example, a decoder, such as decoder 320, may receive a compressed attribute information file, such a compressed attribute information 112 illustrated in FIG. 1A or compressed attribute information file 400 illustrated in FIG. 4. The compressed attribute information file may be received by a decoder via an encoded data interface, such as encoded data interface 326. The encoded compressed point cloud may be used by the decoder to determine spatial information for points of a reference frame of a dynamic point cloud. For example, spatial information of points of a point cloud reference frame may be generated by a spatial information generator, such as spatial information generator 322.

In some embodiments, a compressed point cloud may be received via an encoded data interface, such as encoded data interface 326, from a storage device or other intermediary source, wherein the compressed point cloud was previously encoded by an encoder, such as encoder 104 or 302. In some embodiments, an encoded data interface, such as encoded data interface 326, may decode spatial information. For example the spatial information may have been encoded using various encoding techniques such as arithmetic encoding, Golomb encoding, etc. A spatial information generator, such as spatial information generator 322, may receive decoded spatial information from an encoded data interface, such as encoded data interface 326, and may use the decoded spatial information to generate a representation of the geometry of the point cloud reference frame being decompressed. For example, decoded spatial information may be formatted as residual values to be used in a sub-sampled prediction method to recreate a geometry of a point cloud to be decompressed. In such situations, the spatial information generator 322, may recreate the geometry of the point cloud reference frame being decompressed using decoded spatial information from encoded data interface 326, and prediction order generator 328 may determine a prediction order for the point cloud being decompressed or for a segment of the point cloud being decompressed based on the recreated geometry for the point cloud being decompressed generated by spatial information generator 322.

Once spatial information for a point cloud, or a segment thereof, is determined, a prediction order generator, such as prediction order generator 328, may generate a prediction order, such as a Morton order, based on the spatial information for the point cloud. The prediction order may be used by a prediction evaluator of a decoder, such as prediction evaluator 324 of decoder 320, to determine an evaluation order for determining attribute values of points of the point cloud, or a segment thereof. Additionally, the prediction order may be used by a prediction evaluator, such as prediction evaluator 324, to identify nearest neighboring points to a point being evaluated.

A prediction evaluator of a decoder, such as prediction evaluator 324, may select a starting point of a prediction order for a point cloud, or segment thereof, based on an assigned starting point included in a compressed attribute information file. In some embodiments, the compressed attribute information file may include one or more assigned values for one or more corresponding attributes of the starting point. In some embodiments, a prediction evaluator, such as prediction evaluator 324, may assign values to one or more attributes of a starting point in a decompressed model of a point cloud being decompressed based on assigned values for the starting point included in a compressed attribute information file. A prediction evaluator, such as prediction evaluator 324, may further utilize the assigned values of the attributes of the starting point to determine attribute values of neighboring points. For example, a prediction evaluator may select a next nearest neighboring point to the starting point as a next point to evaluate, wherein the next nearest neighboring point is selected based on a shortest distance to a neighboring point from the starting point in the Morton order. Note that because the prediction order is generated based on the same or similar spatial information at the decoder as was used to generate a prediction order at an encoder, the decoder may determine the same evaluation order for evaluating the points of the point cloud being decompressed as was determined at the encoder by identifying next nearest neighbors in the Morton order.

Once the prediction evaluator has identified the "K" nearest neighboring points to a point being evaluated, the prediction evaluator may predict one or more attribute values for one or more attributes of the point being evaluated based on attribute values of corresponding attributes of the "K" nearest neighboring points. In some embodiments, an inverse distance interpolation technique may be used to predict an attribute value of a point being evaluated based on attribute values of neighboring points, wherein attribute values of neighboring points that are at a closer distance to the point being evaluated are weighted more heavily than attribute values of neighboring points that are at further distances from the point being evaluated.

A prediction evaluator, such as prediction evaluator 324, may apply an attribute correction value to a predicted attribute value to determine an attribute value to include for the point in a decompressed point cloud. In some embodiments, an attribute correction value for an attribute of a point may be included in a compressed attribute information file. In some embodiments, attribute correction values may be encoded using one of a plurality of supported coding contexts, wherein different coding contexts are selected to encode different attribute correction values based on a number of symbols included in the attribute correction value. In some embodiments, a decoder, such as decoder 320, may include a context store, such as context store 332, wherein the context store stores a plurality of encoding context that may be used to decode assigned attribute values or attribute correction values that have been encoded using corresponding encoding contexts at an encoder.

A decoder, such as decoder 320, may provide a decompressed point cloud generated based on a received compressed point cloud and/or a received compressed attribute information file to a receiving device or application via a decoded data interface, such as decoded data interface 330. The decompressed point cloud may include the points of the point cloud and attribute values for attributes of the points of the point cloud. In some embodiments, a decoder may decode some attribute values for attributes of a point cloud without decoding other attribute values for other attributes of a point cloud. For example, a point cloud may include color attributes for points of the point cloud and may also include other attributes for the points of the point cloud, such as velocity, for example. In such a situation, a decoder may decode one or more attributes of the points of the point cloud, such as the velocity attribute, without decoding other attributes of the points of the point cloud, such as the color attributes.

In some embodiments, the decompressed point cloud and/or decompressed attribute information file may be used to generate a visual display, such as for a head mounted display. Also, in some embodiments, the decompressed point cloud and/or decompressed attribute information file may be provided to a decision making engine that uses the decompressed point cloud and/or decompressed attribute information file to make one or more control decisions. In some embodiments, the decompressed point cloud and/or decompressed attribute information file may be used in various other applications or for various other purposes.

FIG. 4 illustrates an example compressed attribute information file, according to some embodiments. Attribute information file 400 includes configuration information 402, point cloud data 404, point attribute correction values 406, and block/segment motion compensation functions 408 (which may include segmentation data for generating the segments at a decoder). In some embodiments, point cloud file 400 may be communicated in parts via multiple packets. In some embodiments, not all of the sections shown in attribute information file 400 may be included in each packet transmitting compressed attribute information. In some embodiments, an attribute information file, such as attribute information file 400, may be stored in a storage device, such as a server that implements an encoder or decoder, or other computing device.

Figure 5:
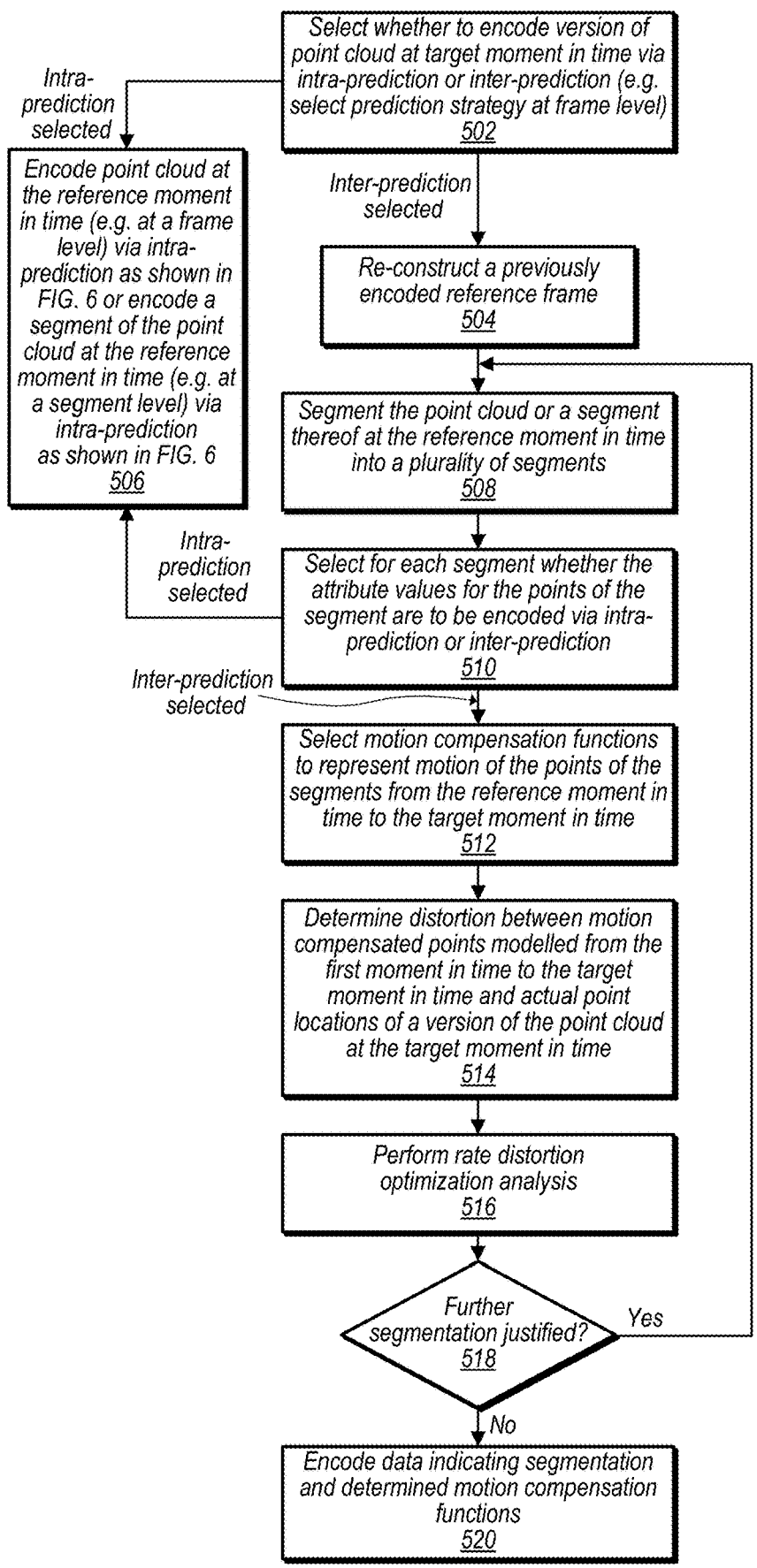
FIG. 5 is a flowchart for encoding attribute information of a dynamic point cloud using intra-prediction or inter-prediction, selected segment by segment, according to some embodiments.

FIG. 5 is a flowchart for encoding attribute information of a dynamic point cloud using intra-prediction or inter-prediction, selected segment by segment, according to some embodiments.

At 502, an encoder determines whether to compress a frame of a dynamic point cloud via an intra-prediction process or via an inter-prediction process. For example, the encoder may determine to compress a version of a dynamic point cloud at a reference moment in time or at a moment in time subsequent to or preceding the reference moment in time via intra-prediction or via inter-prediction at a frame level at 502.

Figure 6:
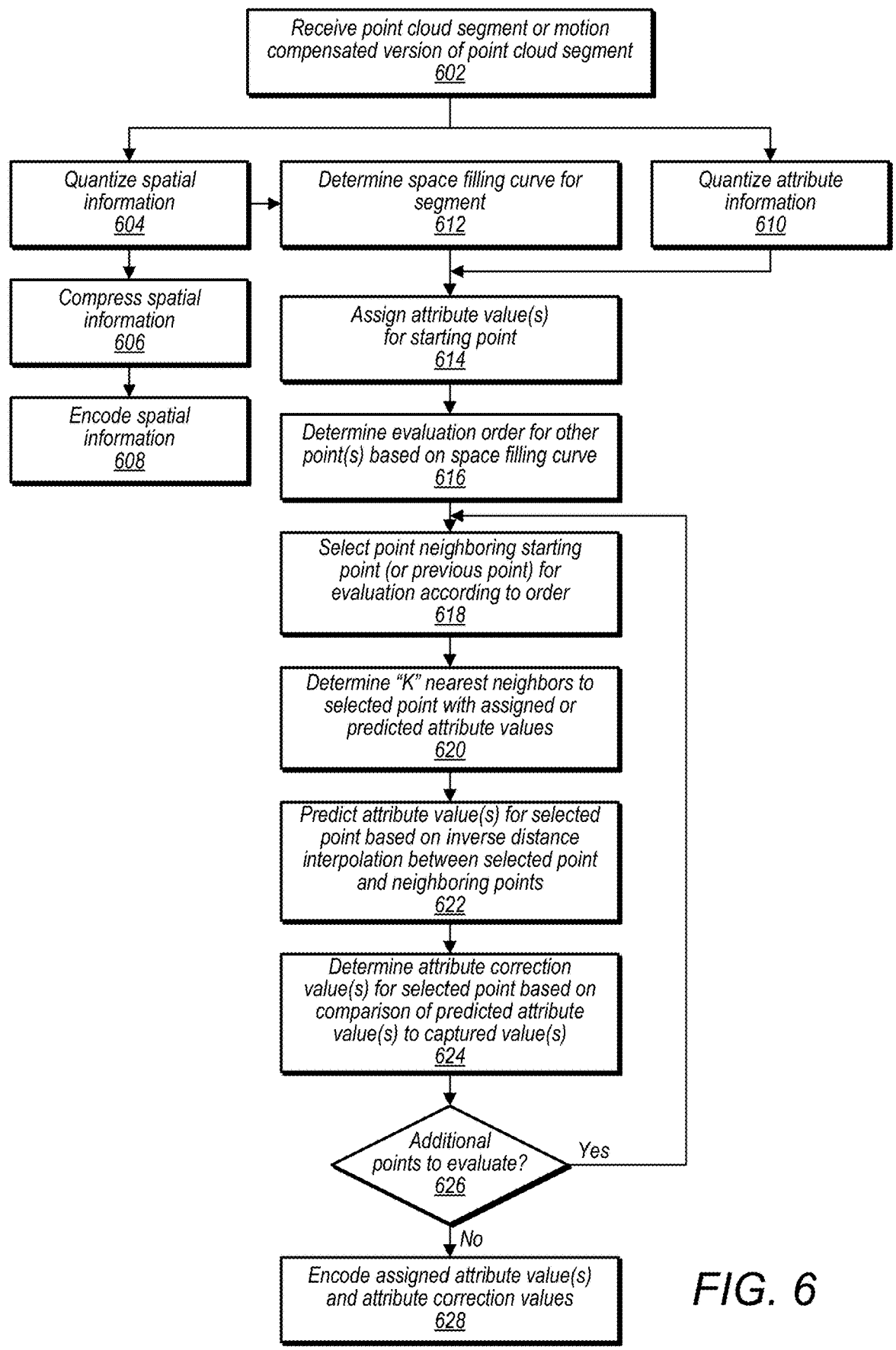
FIG. 6 illustrates additional details for determining attribute correction values for a segment of a point cloud, according to some embodiments.

If intra-prediction is selected at 502, the encoder, at 506, compresses the point cloud via an intra-prediction process. For example, FIG. 6 illustrate additional details regarding compression of an image frame via an intra-prediction process. In some embodiments, the reference frame may be compressed via an intra-prediction process and other target frames may be selected to be compressed via an intra-prediction process or an inter-prediction process. Also, as part of an inter-prediction process, individual segments that have been motion compensated may be compressed via a local intra-prediction process applied to the motion compensated points of the individual segment.

If inter-prediction compression is determined to be used to compress a target frame at 502, at 504 the encoder reconstructs a reference frame for the target frame, wherein the reference frame was previously compressed/encoded, such as via an intra-prediction process. Also, in some embodiments a reference frame may have been compressed via an inter-prediction process.

At 508, the encoder segments the point cloud reference frame, or a segment thereof. Whether or not segments are to be further segmented may be determined based on a rate distortion optimization as described herein.

At 510, the encoder determines for each lowest level segment whether attribute values for the lowest level segment are to be compressed via intra-prediction or inter-prediction. For example, in some embodiments, intra-prediction for a segment may be selected, wherein spatial information for the points at the target reference frame are encoded (as opposed to motion compensated points from the reference frame) and the attribute values for the segment are determined using an intra-prediction process at 506.

If inter-prediction is selected for the segment, at 512, a motion compensation function is selected for the segment from a plurality of supported motion compensation functions. For example, an encoder and decoder may support piece-wise rigid motion compensation functions, affine-motion compensation functions, elastic-motion compensation functions, etc.

At 514, distortion between motion compensated points modelled from the reference frame to the target frame and actual point locations of a version of the point cloud at the target frame are determined.

At 516, a rate distortion optimization is performed to determine whether further segmentation is justified and at 518 it is determined whether further segmentation is justified for each segment.

If further segmentation is justified, the given segment is further segmented at 508 and steps 510 through 516 are repeated for the further segmented segment. If further segmentation is not justified, the encoder, at 520, encodes data indicating the determined segmentation of the reference frame point cloud and the determined motion functions for the determined segments. In some embodiments, the determined motion functions may be explicitly encoded. Also, in some embodiments, only some of the determined motion functions may be explicitly encoded and other ones of the motion functions may be predicted from the explicitly encoded motion functions. In some embodiments an encoder may encode motion function residual values to correct predicted motion functions. Note that different ones of the segments may have different associated motion functions using different parameters for a same type of motion function. In some embodiments, different ones of the segments may be associated with different types of motion functions, such as piece-wise rigid motion functions, affine motion functions, elastic motion functions, etc.

FIG. 6 illustrates a process for compressing attribute information of a point cloud, according to some embodiments.

At 602, an encoder receives a point cloud that includes attribute information for at least some of the points of the point cloud. The point cloud may be received from one or more sensors that capture the point cloud, or the point cloud may be generated in software. For example, a virtual reality or augmented reality system may have generated the point cloud.

At 604, the spatial information of the point cloud, for example X, Y, and Z coordinates for the points of the point cloud may be quantized. In some embodiments, coordinates may be rounded off to the nearest measurement unit, such as a meter, centimeter, millimeter, etc.

At 606, the quantized spatial information is compressed. In some embodiments, spatial information may be compressed using a sub-sampling and subdivision prediction technique. Also, in some embodiments, spatial information may be compressed using a K-D tree compression technique, or may be compressed using an Octree compression technique. In some embodiments, other suitable compression techniques may be used to compress spatial information of a point cloud. In some embodiments, such spatial information compression techniques may be used for spatial information of a reference frame, and motion compensation information and segmentation information may be compressed for subsequent frames, such as versions of a dynamic point cloud at moments in time subsequent to or preceding a reference frame.

At 608, the compressed spatial information for the point cloud is encoded as a compressed point cloud file or a portion of a compressed point cloud file. In some embodiments, compressed spatial information and compressed attribute information may be included in a common compressed point cloud file, or may be communicated or stored as separate files.

At 612, the received spatial information of the point cloud is used to generate a prediction order, such as a Morton order or other space filing curve. In some embodiments, the spatial information of the point cloud may be quantized before generating the prediction order. Additionally, in some embodiments wherein a lossy compression technique is used to compress the spatial information of the point cloud, the spatial information may be lossy encoded and lossy decoded prior to generating the prediction order. In embodiments that utilize lossy compression for spatial information, encoding and decoding the spatial information at the encoder may ensure that a prediction order generated at the encoder will match a prediction order that will be generated at a decoder using decoded spatial information that was previously lossy encoded.

Additionally, in some embodiments, at 610, attribute information for points of the point cloud may be quantized. For example attribute values may be rounded to whole numbers or to particular measurement increments. In some embodiments wherein attribute values are integers, such as when integers are used to communicate string values, such as "walking", "running", "driving", etc., quantization at 610 may be omitted.

At 614, attribute values for a starting point are assigned. The assigned attribute values for the starting point are encoded in a compressed attribute information file along with attribute correction values. Because a decoder predicts attribute values based on distances to neighboring points and attribute values of neighboring points, at least one attribute value for at least one point is explicitly encoded in a compressed attribute file. In some embodiments, points of a point cloud may comprise multiple attributes and at least one attribute value for each type of attribute may be encoded for at least one point of the point cloud, in such embodiments. In some embodiments, a starting point may be a first point evaluated when determining the prediction order at 612. In some embodiments, an encoder may encode data indicating spatial information for a starting point and/or other indicia of which point of the point cloud is the starting point or starting points. Additionally, the encoder may encode attribute values for one or more attributes of the starting point.

At 616, the encoder determines an evaluation order for predicting attribute values for other points of the point cloud, other than the starting point, said predicting and determining attribute correction values, may be referred to herein as "evaluating" attributes of a point. The evaluation order may be determined based on a shortest distance from the starting point to an adjacent neighboring point, wherein the closest neighboring point is selected as the next point in the evaluation order. In some embodiments, an evaluation order may be determined only for a next point to evaluate. In other embodiments, an evaluation order for all or multiple ones of the points of the point cloud may be determined at 616. In some embodiments, an evaluation order may be determined on the fly, e.g. one point at a time as the points are evaluated.

At 618, a neighboring point of the starting point or of a subsequent point being evaluated is selected. In some embodiments, a neighboring point to be next evaluated may be selected based on the neighboring point being at a shortest distance from a point last evaluated, as compared to other neighboring points of the point last evaluated. In some embodiments, a point selected at 618 may be selected based on an evaluation order determined at 616. In some embodiments, an evaluation order may be determined on the fly, e.g. one point at a time as the points are evaluated. For example, a next point in the evaluation order may be determined each time a next point to be evaluated is selected at 618. In such embodiments, 616 may be omitted. Because points are evaluated in an order wherein each next point to be evaluated is at a shortest distance from a point last evaluated, entropy between attribute values of the points being evaluated may be minimized. This is because points adjacent to one another are most likely to have similar attributes. Though in some circumstances, adjacent points may have varying levels of similarity between attributes.

At 620, the "K" nearest neighboring points to the point currently being evaluated are determined. The parameter "K" may be a configurable parameter selected by an encoder or provided to an encoder as a user configurable parameter. In order to select the "K" nearest neighboring points, an encoder may identify the first "K" nearest points to a point being evaluated according to the minimum spanning tree determined at 612. In some embodiments, only points having assigned attribute values or for which predicted attribute values have already been determined may be included in the "K" nearest neighboring points. In some embodiments various numbers of points may identified. For example, in some embodiments, "K" may be 5 points, 10 points, 16 points, etc. Because a point cloud comprises points in 3-D space a particular point may have multiple neighboring points in multiple planes. In some embodiments, an encoder and a decoder may be configured to identify points as the "K" nearest neighboring points regardless of whether or not a value has already been predicted for the point. Also, in some embodiments, attribute values for points used in predication may be previously predicted attribute values or corrected predicted attribute values that have been corrected based on applying an attribute correction value. In either case, an encoder and a decoder may be configured to apply the same rules when identifying the "K" nearest neighboring points and when predicting an attribute value of a point based on attribute values of the "K" nearest neighboring points.

At 622, one or more attribute values are determined for each attribute of the point currently being evaluated. The attribute values may be determined based on an inverse distance interpolation. The inverse distance interpolation may interpolate the predicted attribute value based on the attribute values of the "K" nearest neighboring points. The attribute values of the "K" nearest neighboring points may be weighted based on respective distances between respective ones of the "K" nearest neighboring points and the point being evaluated. Attribute values of neighboring points that are at shorter distances from the point currently being evaluated may be weighted more heavily than attribute values of neighboring points that are at greater distances from the point currently being evaluated.

At 624, attribute correction values are determined for the one or more predicted attribute values for the point currently being evaluated. The attribute correction values may be determined based on comparing the predicted attribute values to corresponding attribute values for the same point (or a similar point) in the point cloud prior to attribute information compression. In some embodiments, quantized attribute information, such as the quantized attribute information generated at 610, may be used to determine attribute correction values. In some embodiments, an attribute correction value may also be referred to as a "residual error" wherein the residual error indicates a difference between a predicted attribute value and an actual attribute value.

At 626, it is determined if there are additional points in the point cloud for which attribute correction values are to be determined. If there are additional points to evaluate, the process reverts to 618 and the next point in the evaluation order is selected to be evaluated. As discussed above, in some embodiments an evaluation order may be determined on the fly, e.g. one point at a time as the points are evaluated. Thus, in such embodiments, a minimum spanning tree may be consulted to select a next point to evaluate based on the next point being at the shortest distance from the point last evaluated. The process may repeat steps 618-626 until all or a portion of all of the points of the point cloud have been evaluated to determine predicted attribute values and attribute correction values for the predicted attribute values.

At 628, the determined attribute correction values, the assigned attribute values, and any configuration information for decoding the compressed attribute information file, such as a parameter "K", is encoded.

The attribute correction values, the assigned attribute values, and any configuration information may be encoded using various encoding techniques.

In some embodiments, the intra-prediction process described in FIG. 6 based on a nearest neighbor prediction strategy may be employed for a whole point cloud at a frame level, such as for a reference frame or an intra-prediction target frame. Also, the intra-prediction process described in FIG. 6 may be employed for a segment of a point cloud, wherein points of the segment have been motion compensated from a reference frame to a target frame as part of an inter-prediction process.

Figure 7:
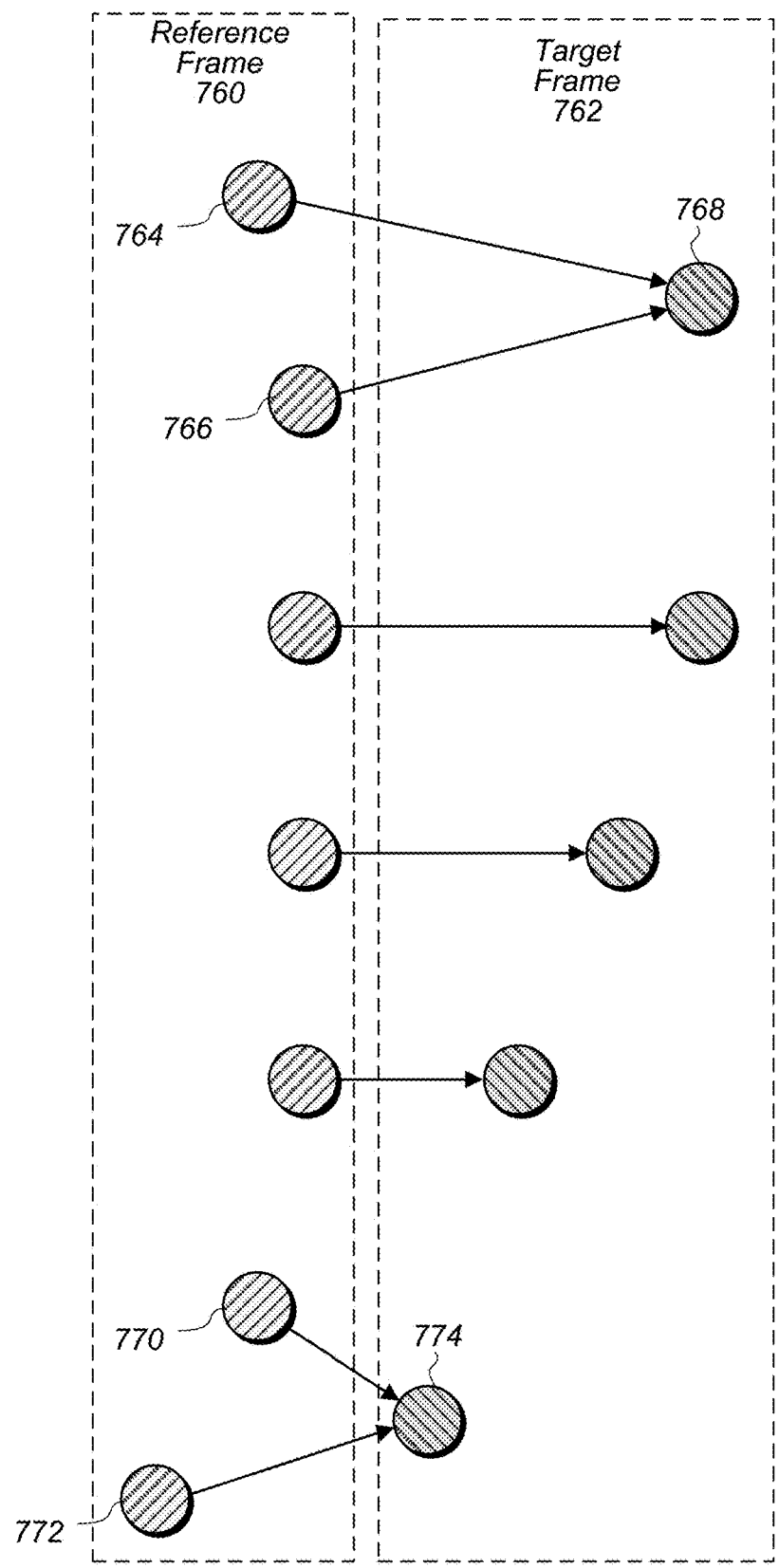
FIG. 7 illustrates an example mapping between frames of a dynamic point cloud comprising different numbers of points, according to some embodiments.

FIG. 7 illustrates an example of versions of a point cloud at different moments in time that have different numbers of points and mappings between the points at the different moments in time, according to some embodiments.

In some embodiments, a version of a point cloud at a first moment in time may include more or fewer points than another version of the point cloud at another moment in time. For example, reference frame 760 shown in FIG. 7 includes more points than target frame 762. In such a circumstance, a point mapping process may map more than one point in a particular version of a point cloud to a single point in a subsequent or preceding version of the point cloud. For example, points 764 and 766 are both mapped to point 768. Also both points 770 and 772 are mapped to point 774. In some embodiments, alternatively or additionally, an encoder may re-sample one or more versions of the point cloud such that the different versions have the same number of points or less of a difference in point count.

Level of Detail Attribute Compression

In some circumstances, a number of bits needed to encode attribute information for a point cloud may make up a significant portion of a bit stream for the point cloud. For example, the attribute information may make up a larger portion of the bit stream than is used to transmit compressed spatial information for the point cloud.

In some embodiments, spatial information may be used to build a hierarchical Level of Detail (LOD) structure. The LOD structure may be used to compress attributes associated with a point cloud. For example the intra-prediction and inter-prediction techniques described above may be combined with any of the LOD techniques described herein. The LOD structure may also enable advanced functionalities such as progressive/view-dependent streaming and scalable rendering. For example, in some embodiments, compressed attribute information may be sent (or decoded) for only a portion of the point cloud (e.g. a level of detail) without sending (or decoding) all of the attribute information for the whole point cloud.

Figure 8:
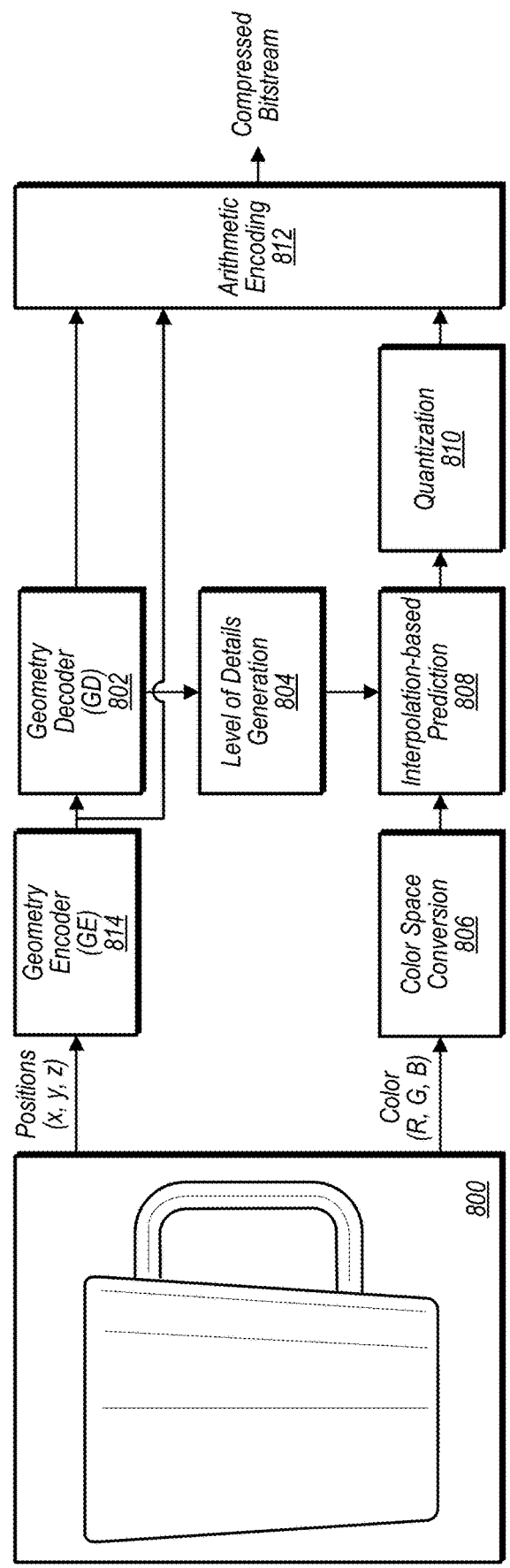
FIG. 8 illustrates components an example encoder that generates a hierarchical level of detail (LOD) structure, according to some embodiments.

FIG. 8 illustrates an example encoding process that generates a hierarchical LOD structure, according to some embodiments. For example, in some embodiments, an encoder such as encoder 302 may generate compressed attribute information in a LOD structure using a similar process as shown in FIG. 8.

In some embodiments, geometry information (also referred to herein as "spatial information") may be used to efficiently predict attribute information. For example, in FIG. 8 the compression of color information is illustrated. However, a LOD structure may be applied to compression of any type of attribute (e.g., reflectance, texture, modality, etc.) associated with points of a point cloud. Note that a pre-encoding step which applies color space conversion or updates the data to make the data better suited for compression may be performed depending on the attribute to be compressed.

In some embodiments, attribute information compression according to a LOD process proceeds as described below.

For example, let Geometry (G)={Point-P(0), P(1), . . . P(N-1)} be reconstructed point cloud positions generated by a spatial decoder included in an encoder (geometry decoder GD 802) after decoding a compressed geometry bit stream produced by a geometry encoder, also included in the encoder (geometry encoder GE 814), such as spatial encoder 304. For example, in some embodiments, an encoder such as encoder 302 may include both a geometry encoder, such as geometry encoder 814, and a geometry decoder, such as geometry decoder 814. In some embodiments, a geometry encoder may be part of spatial encoder 304 and a geometry decoder may be part of prediction/correction evaluator 306.

In some embodiments, a minimum spanning tree generator may be omitted, such as minimum spanning tree generator 310.

In some embodiments, the decompressed spatial information may describe locations of points in 3D space, such as X, Y, and Z coordinates of the points that make up mug 800. Note that spatial information may be available to both an encoder, such as encoder 302, and a decoder, such as decoder 320. For example various techniques, such as K-D tree compression, octree compression, nearest neighbor prediction, etc., may be used to compress and/or encode spatial information for mug 800 and the spatial information may be sent to a decoder with, or in addition to, compressed attribute information for attributes of the points that make up a point cloud for mug 800.

In some embodiments, a deterministic re-ordering process may be applied on both an encoder side (such as at encoder 302) and at a decoder side (such as at decoder 320) in order to organize points of a point cloud, such as the points that represent mug 800, in a set of Level of Details (LODs). For example, levels of detail may be generated by a level of detail generator 804, which may be included in a prediction/correction evaluator of an encoder, such as prediction/correction evaluator 306 of encoder 302. In some embodiments, a level of detail generator 804 may be a separate component of an encoder, such as encoder 302. For example, level of detail generator 804 may be a separate component of encoder 302. Note that no additional information needs to be included in the bit stream to generate such LOD structures, except for the parameters of the LOD generation algorithm, For example, parameters that may be included in a bit stream as parameters of the LOD generator algorithm may include:

The maximum number of LODs to be generated denoted by "N" (e.g., N=6),

The initial sampling distance "D0" (e.g., D0=64), and

The sampling distance update factor "f" (e.g., ½).

In some embodiments, the parameters N, D0 and f, may be provided by a user, such as an engineer configuring a compression process. In some embodiments the parameters N, D0 and f, may be determined automatically by an encoder/and or decoder using an optimization procedure, for example. These parameters may be fixed or adaptive.

In some embodiments, LOD generation may proceed as follows:

Points of geometry G (e.g. the points of the point cloud organized according to the spatial information), such as points of mug 800, are marked as non-visited and a set of visited points V is set to be empty.

The LOD generation process may then proceed iteratively. At each iteration j, the level of detail for that refinement level, e.g. LOD(j), may be generated as follows:

The sampling distance for the current LOD, denoted D(j) may be set as follows:

a. If j=0, then D(j)=D0.

b. If j>0 and j<N, then D(j)=D(j−1)*f.

c. if j=N, then D(j)=0.

The LOD generation process iterates over all the points of G.

a. At the point evaluation iteration i, a point P(i) is evaluated, i. if the point P(i) has been visited then it is ignored and the algorithm jumps to the next iteration (i+1), e.g. the next point P(i+1) is evaluated.

ii. Otherwise, the distance D(i, V), defined as the minimum distance from P(i) over all the points of V, is computed. Note that V is the list of points that have already been visited. If V is empty, the distance D(i, V) is set to 0, meaning that the distance from point P(i) to the visited points is zero because there are not any visited points in the set V. If the shortest distance from point P(i) to any of the already visited point, D(i, V), is strictly higher than a parameter D0, then the point is ignored and the LoD generation jumps to the iteration (i+1) and evaluates the next point P(i+1). Otherwise, P(i) is marked as a visited point and the point P(i) is added to the set of visited points V.

b. This process may be repeated until all the points of geometry G are traversed.

The set of points added to V during the iteration j describes the refinement level R(j).

The LOD(j) may be obtained by taking the union of all the refinement levels R(0), R(1), ..., R(j).

In some embodiments, the process described above, may be repeated until all the LODs are generated or all the vertices have been visited.

In some embodiments, an encoder as described above may further include a quantization module (not shown) that quantizes geometry information included in the "positions (x,y,z) being provided to the geometry encoder 814. Furthermore, in some embodiments, an encoder as described above may additionally include a module that removes duplicated points subsequent to quantization and before the geometry encoder 814.

In some embodiments, quantization may further be applied to compressed attribute information, such as attribute correction values and/or one or more attribute value starting points. For example quantization is performed at 810 to attribute correction values determined by interpolation-based prediction module 808. Quantization techniques may include uniform quantization, uniform quantization with a dead zone, non-uniform/non-linear quantization, trellis quantization, or other suitable quantization techniques.

Example Level of Detail Hierarchy

FIG. 9A illustrates an example LOD, according to some embodiments. Note that the LOD generation process may generate uniformly sampled approximations (or levels of detail) of the original point cloud, that get refined as more and more points are included. Such a feature makes it particularly adapted for progressive/view-dependent transmission and scalable rendering. For example, 904 may include more detail than 902, and 906 may include more detail than 904. Also, 908 may include more detail than 902, 904, and 906.

The hierarchical LOD structure may be used to build an attribute prediction strategy. For example, in some embodiments the points may be encoded in the same order as they were visited during the LOD generation phase. Attributes of each point may be predicted by using the K-nearest neighbors that have been previously encoded. In some embodiments, "K" is a parameter that may be defined by the user or may be determined by using an optimization strategy. "K" may be static or adaptive. In the latter case where "K" is adaptive, extra information describing the parameter may be included in the bit stream.

In some embodiments, different prediction strategies may be used. For example, one of the following interpolation strategies may be used, as well as combinations of the following interpolation strategies, or an encoder/decoder may adaptively switch between the different interpolation strategies. The different interpolation strategies may include interpolation strategies such as: inverse-distance interpolation, barycentric interpolation, natural neighbor interpolation, moving least squares interpolation, or other suitable interpolation techniques. For example, interpolation based prediction may be performed at an interpolation-based prediction module 808 included in a prediction/correction value evaluator of an encoder, such as prediction/correction value evaluator 306 of encoder 302. Also, interpolation based prediction may be performed at an interpolation-based prediction module 808 included in a prediction evaluator of a decoder, such as prediction evaluator 324 of decoder 320. In some embodiments, a color space may also be converted, at color space conversion module 806, prior to performing interpolation based prediction. In some embodiments, a color space conversion module 806 may be included in an encoder, such as encoder 302. In some embodiments, a decoder may further included a module to convert a converted color space, back to an original color space.

In some embodiments, quantization may further be applied to attribute information. For example quantization may performed at quantization module 810. In some embodiments, a encoder, such as encoder 302, may further include a quantization module 810. Quantization techniques employed by a quantization module 810 may include uniform quantization, uniform quantization with a dead zone, non-uniform/non-linear quantization, trellis quantization, or other suitable quantization techniques.

In some embodiments, LOD attribute compression may be used to compress dynamic point clouds as follows:

Let FC be the current point cloud frame and RF be the reference point cloud.

Let M be the motion field that deforms RF to take the shape of FC.

M may be computed on the decoder side and in this case information may not be encoded in the bit stream.

M may be computed by the encoder and explicitly encoded in the bit stream

M may be encoded by applying a hierarchical compression technique as described herein to the motion vectors associated with each point of RF (e.g. the motion of RF may be considered as an extra attribute).

M may be encoded as a skeleton/skinning-based model with associated local and global transforms.

M may be encoded as a motion field defined based on an octree structure, which is adaptively refined to adapt to motion field complexity.

M may be described by using any suitable animation technique such as key-frame-based animations, morphing techniques, free-form deformations, key-point-based deformation, etc.

Let RF' be the point cloud obtained after applying the motion field M to RF. The points of RF' may be then used in the attribute prediction strategy by considering not only the "K" nearest neighbor points of FC but also those of RF'.

Furthermore, attribute correction values may be determined based on comparing the interpolation-based prediction values determined at interpolation-based prediction module 808 to original non-compressed attribute values. The attribute correction values may further be quantized at quantization module 810 and the quantitated attribute correction values, encoded spatial information (output from the geometry encoder 802) and any configuration parameters used in the prediction may be encoded at arithmetic encoding module 812. In some embodiments, the arithmetic encoding module, may use a context adaptive arithmetic encoding technique. The compressed point cloud may then be provided to a decoder, such as decoder 320, and the decoder may determine similar levels of detail and perform interpolation based prediction to recreate the original point cloud based on the quantized attribute correction values, encoded spatial information (output from the geometry encoder 802) and the configuration parameters used in the prediction at the encoder.

FIG. 9B illustrates an example compressed point cloud file comprising LODs, according to some embodiments. Level of detail attribute information file 950 includes configuration information 952, point cloud data 954, and level of detail point attribute correction values 956. In some embodiments, level of detail attribute information file 950 may be communicated in parts via multiple packets. In some embodiments, not all of the sections shown in the level of detail attribute information file 950 may be included in each packet transmitting compressed attribute information. In some embodiments, a level of detail attribute information file, such as level of detail attribute information file 950, may be stored in a storage device, such as a server that implements an encoder or decoder, or other computing device.

Figure 10A:
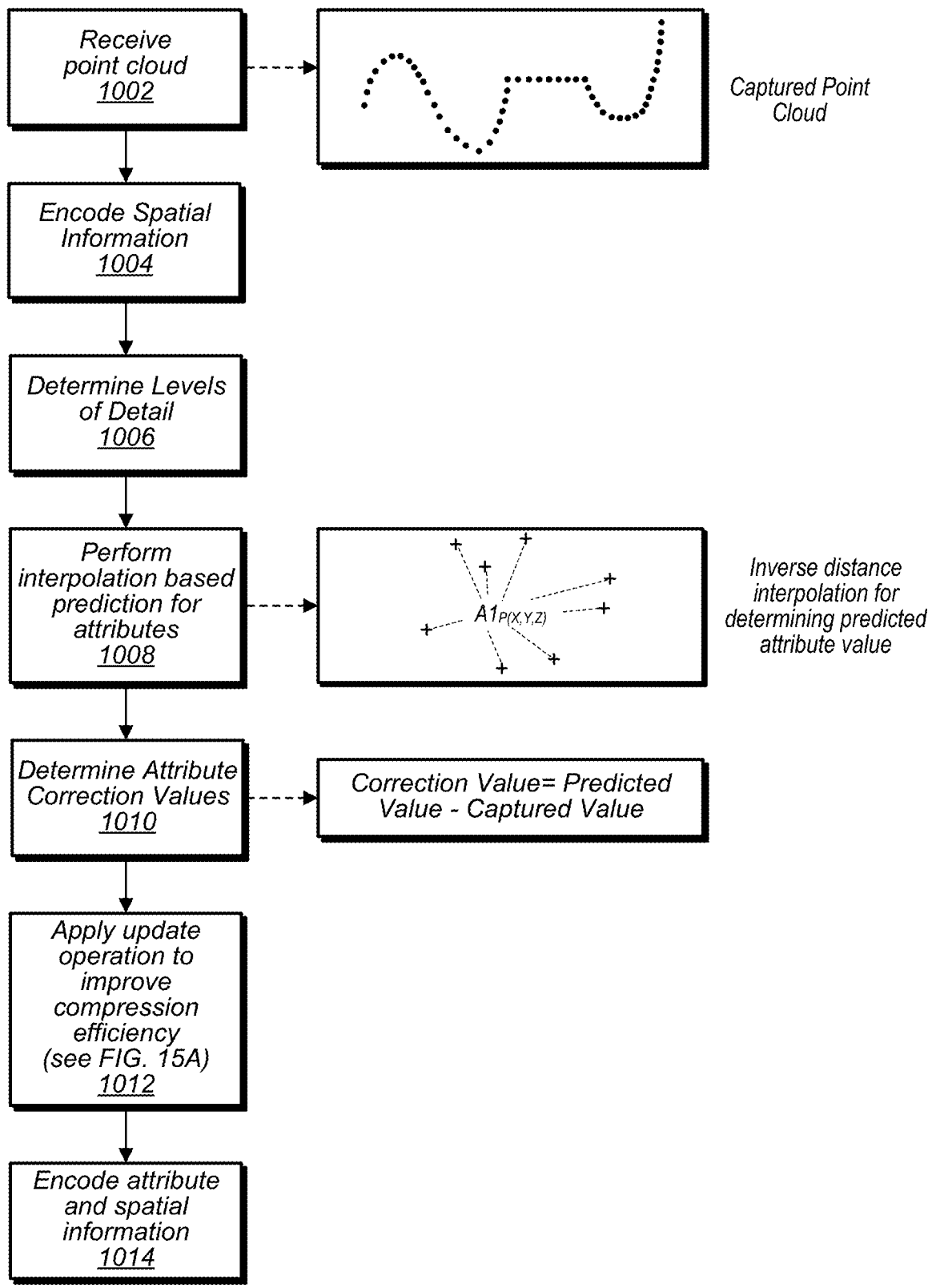
FIG. 10A illustrates a method of determining and encoding attribute information of a point cloud using LODs, according to some embodiments.

FIG. 10A illustrates a method of encoding attribute information of a point cloud, according to some embodiments.

At 1002, a point cloud is received by an encoder. The point cloud may be captured, for example by one or more sensors, or may be generated, for example in software.

At 1004, spatial or geometry information of the point cloud is encoded as described herein. For example, the spatial information may be encoded using K-D trees, Octrees, a neighbor prediction strategy, or other suitable technique to encoded the spatial information.

At 1006, one or more level of details are generated, as described herein. For example, the levels of detail may be generated using a similar process as shown in FIG. 8. Note that in some embodiments, the spatial information encoded or compressed at 1004 may be de-coded or decompressed to generate a representative decompressed point cloud geometry that a decoder would encounter. This representative decompressed point cloud geometry may then be used to generate a LOD structure as further described in FIG. 8.

At 1008, an interpolation based prediction is performed to predict attribute values for the attributes of the points of the point cloud. At 1010, attribute correction values are determined based on comparing the predicted attribute values to original attribute values. For example, in some embodiments, an interpolation based prediction may be performed for each level of detail to determine predicted attribute values for points included in the respective levels of detail. These predicted attribute values may then be compared to attribute values of the original point cloud prior to compression to determine attribute correction values for the points of the respective levels of detail. For example, an interpolation based prediction process as described herein may be used to determine predicted attribute values for various levels of detail. In some embodiments, attribute correction values may be determined for multiple levels of detail of a LOD structure. For example a first set of attribute correction values may be determined for points included in a first level of detail and additional sets of attribute correction values may be determined for points included in other levels of detail.

At 1012, an update operation may optionally be applied that affects the attribute correction values determined at 1010.

At 1014, attribute correction values, LOD parameters, encoded spatial information (output from the geometry encoder) and any configuration parameters used in the prediction are encoded, as described herein.

In some embodiments, the attribute information encoded at 1014 may include attribute information for multiple or all levels of detail of the point cloud, or may include attribute information for a single level of detail or fewer than all levels of detail of the point cloud. In some embodiments, level of detail attribute information may be sequentially encoded by an encoder. For example, an encoder may make available a first level of detail before encoding attribute information for one or more additional levels of detail.

In some embodiments, an encoder may further encode one or more configuration parameters to be sent to a decoder, such as any of the configuration parameters shown in configuration information 952 of compressed attribute information file 950. For example, in some embodiments, an encoder may encode a number of levels of detail that are to be encoded for a point cloud. The encoder may also encode a sampling distance update factor, wherein the sampling distance is used to determine which points are to be included in a given level of detail.

Figure 10B:
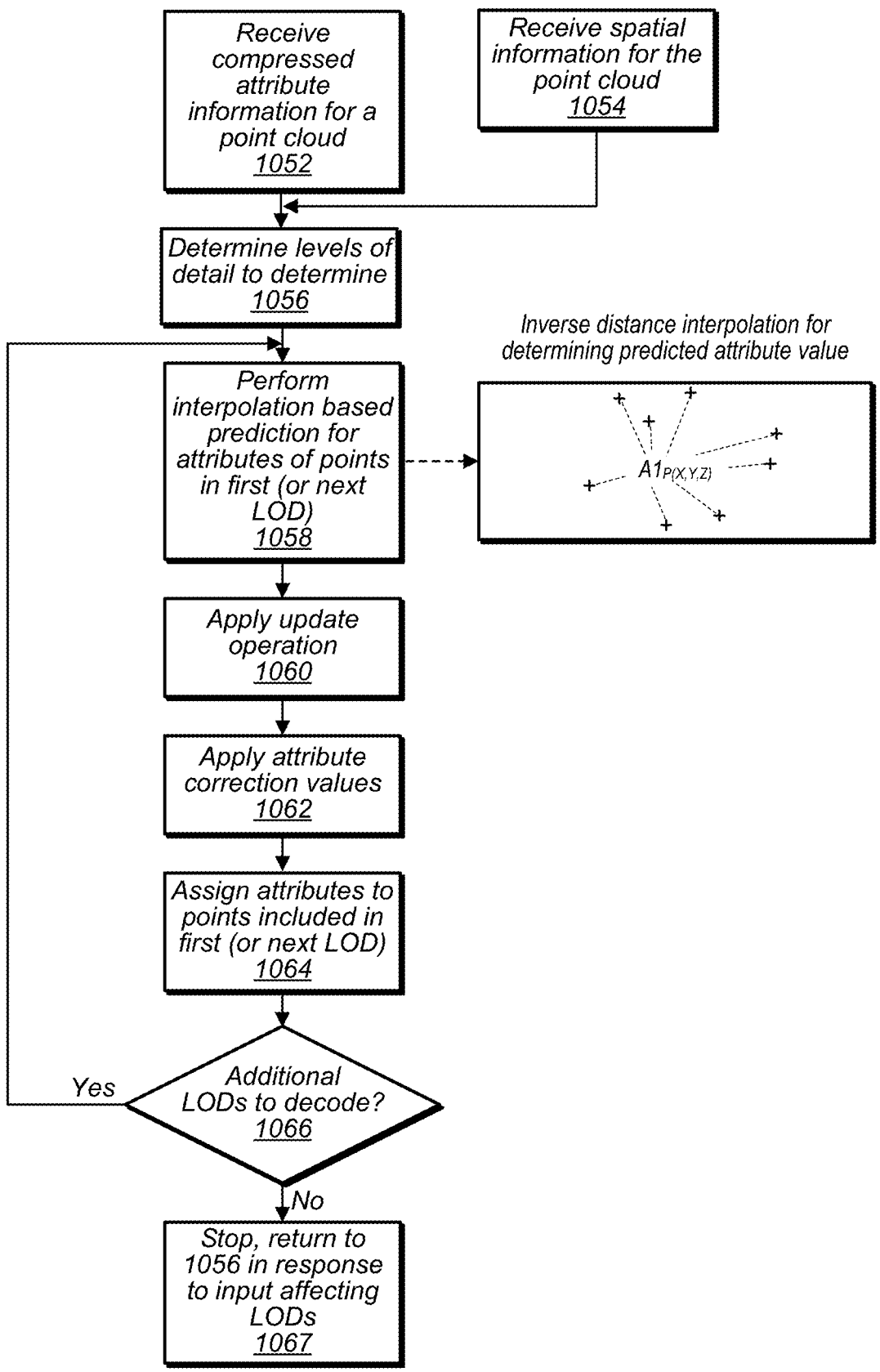
FIG. 10B illustrates a method of decoding attribute information of a point cloud using LODs, according to some embodiments.

FIG. 10B illustrates a method of decoding attribute information of a point cloud, according to some embodiments.

At 1052, compressed attribute information for a point cloud is received at a decoder. Also, at 1054 spatial information for the point cloud is received at the decoder. In some embodiments, the spatial information may be compressed or encoded using various techniques, such as a K-D tree, Octree, neighbor prediction, etc. and the decoder may decompress and/or decode the received spatial information at 1054.

At 1056, the decoder determines which level of detail of a number of levels of detail to decompress/decode. The selected level of detail to decompress/decode may be determined based on a viewing mode of the point cloud. For example, a point cloud being viewed in a preview mode may require a lower level of detail to be determined than a point cloud being viewed in a full view mode. Also, a location of a point cloud in a view being rendered may be used to determine a level of detail to decompress/decode. For example, a point cloud may represent an object such as the coffee mug shown in FIG. 9A. If the coffee mug is in a foreground of a view being rendered a higher level of detail may be determined for the coffee mug. However, if the coffee mug is in the background of a view being rendered, a lower level of detail may be determined for the coffee mug. In some embodiments, a level of detail to determine for a point cloud may be determined based on a data budget allocated for the point cloud.

At 1058 points included in the first level of detail (or next level of detail) being determined may be determined as described herein. For the points of the level of detail being evaluated, attribute values of the points may be predicted based on an inverse distance weighted interpolation based on the k-nearest neighbors to each point being evaluated, where k may be a fixed or adjustable parameter.

At 1060, in some embodiments, an update operation may be performed on the predicted attribute values.

At 1062, attribute correction values included in the compressed attribute information for the point cloud may be decoded for the current level of detail being evaluated and may be applied to correct the attribute values predicted at 1058 or the updated predicted attribute values determined at 1060.

At 1064, the corrected attribute values determined at 1062 may be assigned as attributes to the points of the first level of detail (or the current level of detail being evaluated). In some embodiments, the attribute values determined for subsequent levels of details may be assigned to points included in the subsequent levels of detail while attribute values already determined for previous levels of detail are retained by the respective points of the previous level(s) of detail. In some embodiments, new attribute values may be determined for sequential levels of detail.

In some embodiments, the spatial information received at 1054 may include spatial information for multiple or all levels of detail of the point cloud, or may include spatial information for a single level of detail or fewer than all levels of detail of the point cloud. In some embodiments, level of detail attribute information may be sequentially received by a decoder. For example, a decoder may receive a first level of detail and generate attribute values for points of the first level of detail before receiving attribute information for one or more additional levels of detail.

At 1066 it is determined if there are additional levels of detail to decode. If so, the process returns to 1058 and is repeated for the next level of detail to decode. If not the process is stopped at 1067, but may resume at 1056 in response to input affecting the number of levels of detail to determine, such as change in view of a point cloud or a zoom operation being applied to a point cloud being viewed, as a few examples of an input affecting the levels of detail to be determined.

In some embodiments the spatial information described above may be encoded and decoded via a geometry encoder and arithmetic encoder, such as geometry encoder 814 and arithmetic encoder 812 described above in regard to FIG. 8. In some embodiments, a geometry encoder, such as geometry encoder 814 may utilize an octree compression technique and arithmetic encoder 812 may be a binary arithmetic encoder as described in more detail below.

Example Applications for Point Cloud Compression and Decompression

Figure 11:
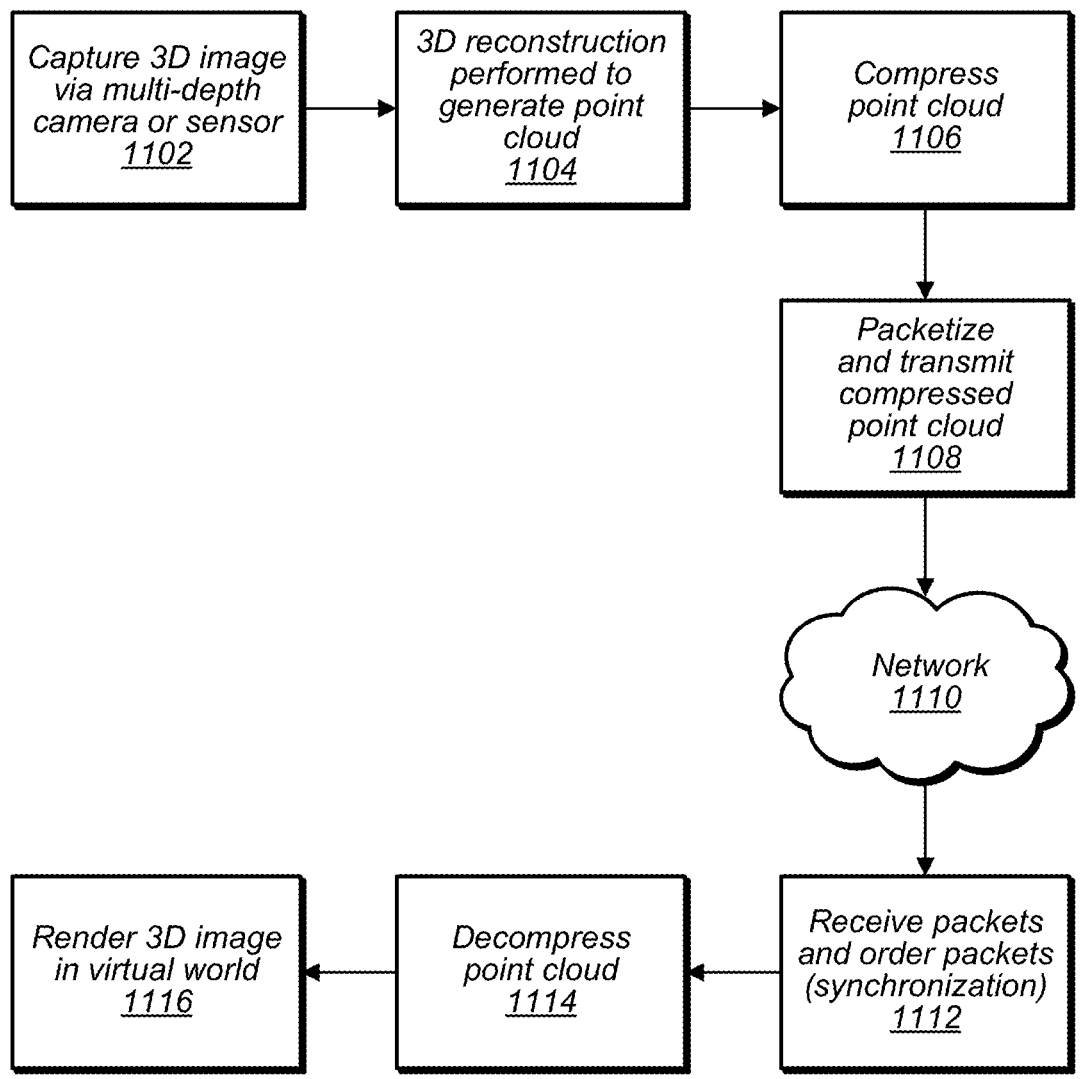
FIG. 11 illustrates compressed point cloud information being used in a 3-D application, according to some embodiments.

FIG. 11 illustrates compressed point clouds being used in a 3-D application, according to some embodiments.

In some embodiments, a sensor, such as sensor 102, an encoder, such as encoder 104 or encoder 302, and a decoder, such as decoder 116 or decoder 320, may be used to communicate point clouds in a 3-D application. For example, a sensor, such as sensor 102, at 1102 may capture a 3D image and at 1104, the sensor or a processor associated with the sensor may perform a 3D reconstruction based on sensed data to generate a point cloud.

At 1106, an encoder such as encoder 104 or 302 may compress the point cloud and at 1108 the encoder or a post processor may packetize and transmit the compressed point cloud, via a network 1110. At 1112, the packets may be received at a destination location that includes a decoder, such as decoder 116 or decoder 320. The decoder may decompress the point cloud at 1114 and the decompressed point cloud may be rendered at 1116. In some embodiments a 3-D application may transmit point cloud data in real time such that a display at 1116 represents images being observed at 1102. For example, a camera in a canyon may allow a remote user to experience walking through a virtual canyon at 1116.

Figure 12:
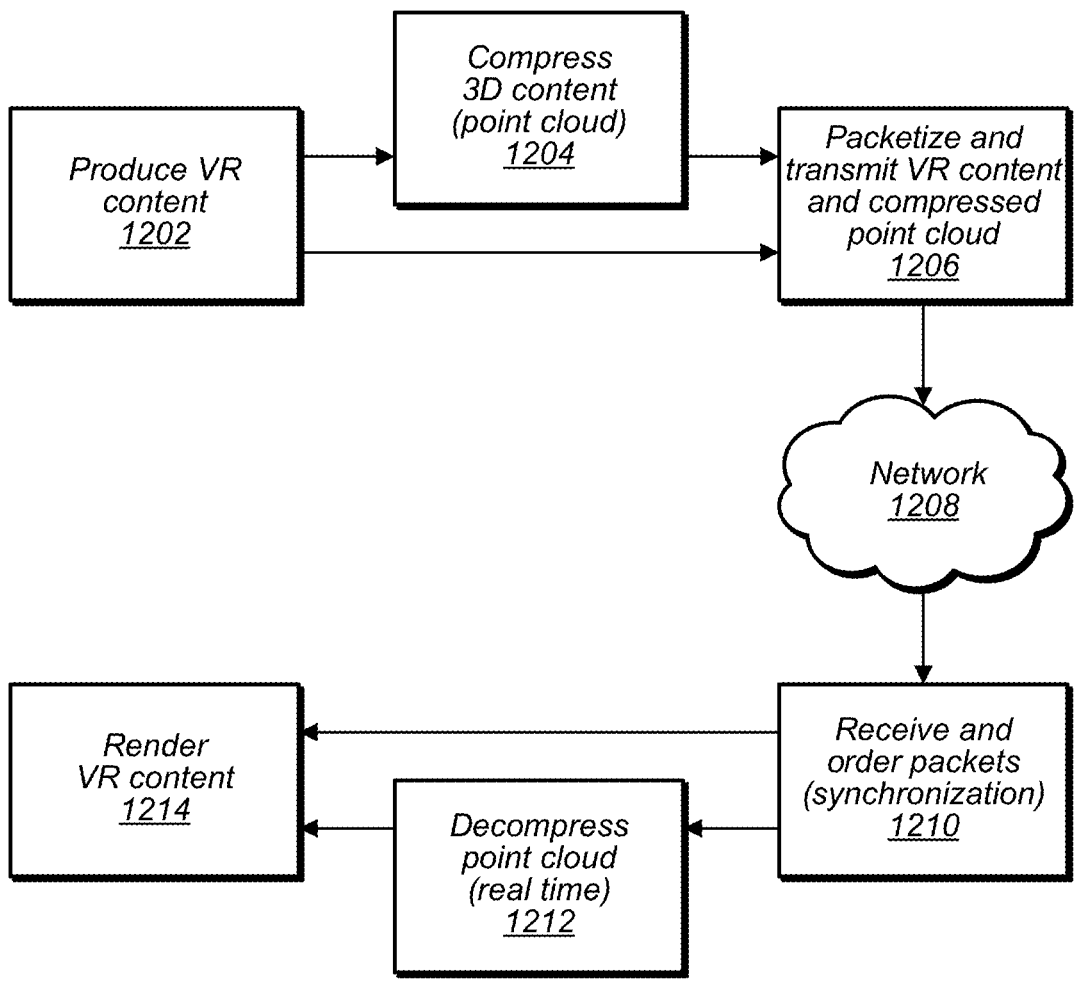
FIG. 12 illustrates compressed point cloud information being used in a virtual reality application, according to some embodiments.

FIG. 12 illustrates compressed point clouds being used in a virtual reality (VR) or augmented reality (AR) application, according to some embodiments.

In some embodiments, point clouds may be generated in software (for example as opposed to being captured by a sensor). For example, at 1202 virtual reality or augmented reality content is produced. The virtual reality or augmented reality content may include point cloud data and non-point cloud data. For example, a non-point cloud character may traverse a landscape represented by point clouds, as one example. At 1204, the point cloud data may be compressed and at 1206 the compressed point cloud data and non-point cloud data may be packetized and transmitted via a network 1208. For example, the virtual reality or augmented reality content produced at 1202 may be produced at a remote server and communicated to a VR or AR content consumer via network 1208. At 1210, the packets may be received and synchronized at the VR or AR consumer's device. A decoder operating at the VR or AR consumer's device may decompress the compressed point cloud at 1212 and the point cloud and non-point cloud data may be rendered in real time, for example in a head mounted display of the VR or AR consumer's device. In some embodiments, point cloud data may be generated, compressed, decompressed, and rendered responsive to the VR or AR consumer manipulating the head mounted display to look in different directions.

In some embodiments, point cloud compression as described herein may be used in various other applications, such as geographic information systems, sports replay broadcasting, museum displays, autonomous navigation, etc.

Example Computer System

Figure 13:
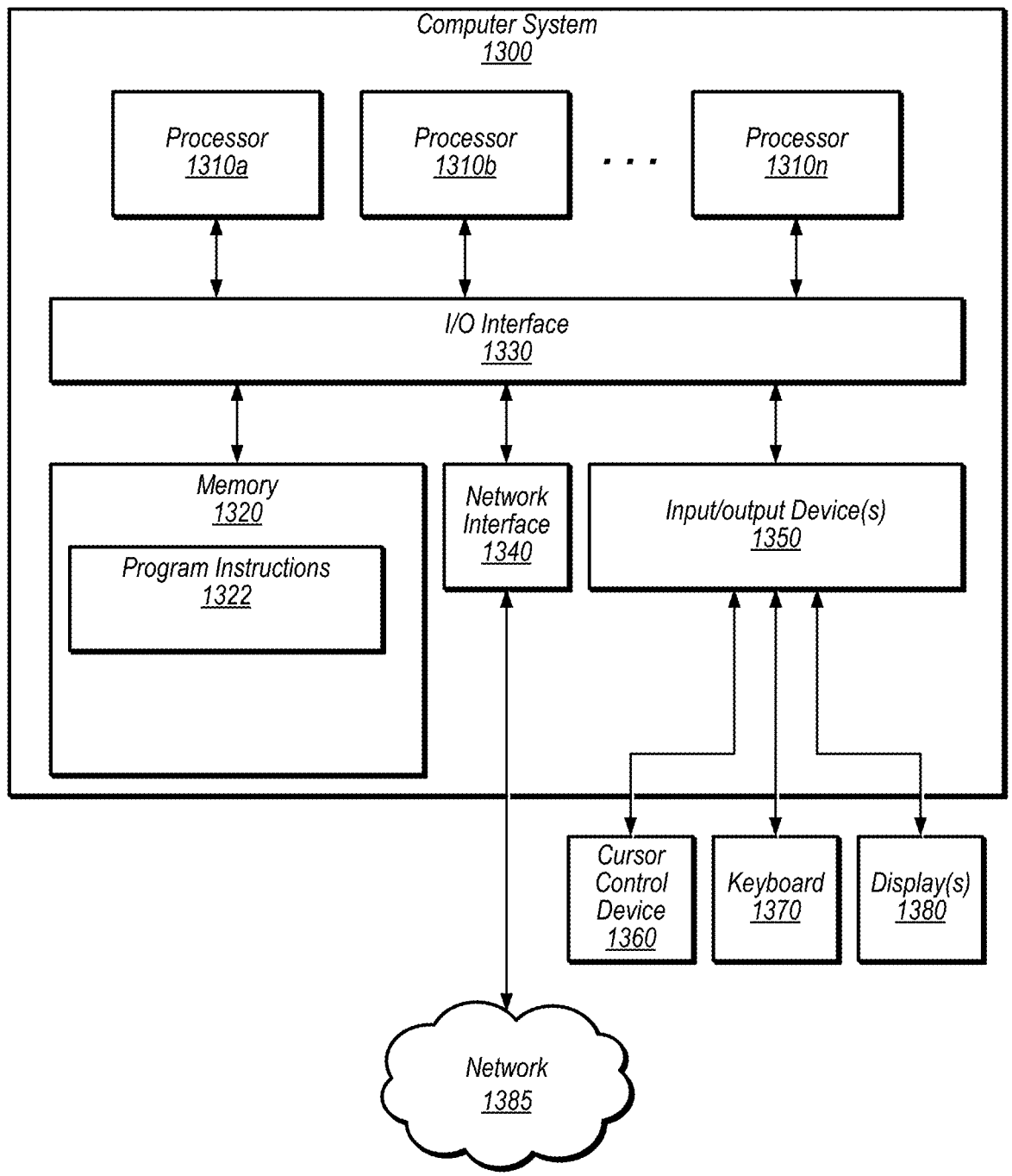
FIG. 13 illustrates an example computer system that may implement an encoder or decoder, according to some embodiments.

FIG. 13 illustrates an example computer system 1300 that may implement an encoder or decoder or any other ones of the components described herein, (e.g., any of the components described above with reference to FIGS. 1-12), in accordance with some embodiments. The computer system 1300 may be configured to execute any or all of the embodiments described above. In different embodiments, computer system 1300 may be any of various types of devices, including, but not limited to, a personal computer system, desktop computer, laptop, notebook, tablet, slate, pad, or netbook computer, mainframe computer system, handheld computer, workstation, network computer, a camera, a set top box, a mobile device, a consumer device, video game console, handheld video game device, application server, storage device, a television, a video recording device, a peripheral device such as a switch, modem, router, or in general any type of computing or electronic device.

Various embodiments of a point cloud encoder or decoder, as described herein may be executed in one or more computer systems 1300, which may interact with various other devices. Note that any component, action, or functionality described above with respect to FIGS. 1-12 may be implemented on one or more computers configured as computer system 1300 of FIG. 13, according to various embodiments. In the illustrated embodiment, computer system 1300 includes one or more processors 1310 coupled to a system memory 1320 via an input/output (I/O) interface 1330. Computer system 1300 further includes a network interface 1340 coupled to I/O interface 1330, and one or more input/output devices 1350, such as cursor control device 1360, keyboard 1370, and display(s) 1380. In some cases, it is contemplated that embodiments may be implemented using a single instance of computer system 1300, while in other embodiments multiple such systems, or multiple nodes making up computer system 1300, may be configured to host different portions or instances of embodiments. For example, in one embodiment some elements may be implemented via one or more nodes of computer system 1300 that are distinct from those nodes implementing other elements.

In various embodiments, computer system 1300 may be a uniprocessor system including one processor 1310, or a multiprocessor system including several processors 1310 (e.g., two, four, eight, or another suitable number). Processors 1310 may be any suitable processor capable of executing instructions. For example, in various embodiments processors 1310 may be general-purpose or embedded processors implementing any of a variety of instruction set architectures (ISAs), such as the x86, PowerPC, SPARC, or MIPS ISAs, or any other suitable ISA. In multiprocessor systems, each of processors 1310 may commonly, but not necessarily, implement the same ISA.

System memory 1320 may be configured to store point cloud compression or point cloud decompression program instructions 1322 and/or sensor data accessible by processor 1310. In various embodiments, system memory 1320 may be implemented using any suitable memory technology, such as static random access memory (SRAM), synchronous dynamic RAM (SDRAM), nonvolatile/Flash-type memory, or any other type of memory. In the illustrated embodiment, program instructions 1322 may be configured to implement an image sensor control application incorporating any of the functionality described above. In some embodiments, program instructions and/or data may be received, sent or stored upon different types of computer-accessible media or on similar media separate from system memory 1320 or computer system 1300. While computer system 1300 is described as implementing the functionality of functional blocks of previous Figures, any of the functionality described herein may be implemented via such a computer system.

In one embodiment, I/O interface 1330 may be configured to coordinate I/O traffic between processor 1310, system memory 1320, and any peripheral devices in the device, including network interface 1340 or other peripheral interfaces, such as input/output devices 1350. In some embodiments, I/O interface 1330 may perform any necessary protocol, timing or other data transformations to convert data signals from one component (e.g., system memory 1320) into a format suitable for use by another component (e.g., processor 1310). In some embodiments, I/O interface 1330 may include support for devices attached through various types of peripheral buses, such as a variant of the Peripheral Component Interconnect (PCI) bus standard or the Universal Serial Bus (USB) standard, for example. In some embodiments, the function of I/O interface 1330 may be split into two or more separate components, such as a north bridge and a south bridge, for example. Also, in some embodiments some or all of the functionality of I/O interface 1330, such as an interface to system memory 1320, may be incorporated directly into processor 1310.

Network interface 1340 may be configured to allow data to be exchanged between computer system 1300 and other devices attached to a network 1385 (e.g., carrier or agent devices) or between nodes of computer system 1300. Network 1385 may in various embodiments include one or more networks including but not limited to Local Area Networks (LANs) (e.g., an Ethernet or corporate network), Wide Area Networks (WANs) (e.g., the Internet), wireless data networks, some other electronic data network, or some combination thereof. In various embodiments, network interface 1340 may support communication via wired or wireless general data networks, such as any suitable type of Ethernet network, for example; via telecommunications/telephony networks such as analog voice networks or digital fiber communications networks; via storage area networks such as Fibre Channel SANs, or via any other suitable type of network and/or protocol.

Input/output devices 1350 may, in some embodiments, include one or more display terminals, keyboards, keypads, touchpads, scanning devices, voice or optical recognition devices, or any other devices suitable for entering or accessing data by one or more computer systems 1300. Multiple input/output devices 1350 may be present in computer system 1300 or may be distributed on various nodes of computer system 1300. In some embodiments, similar input/output devices may be separate from computer system 1300 and may interact with one or more nodes of computer system 1300 through a wired or wireless connection, such as over network interface 1340.

As shown in FIG. 13, memory 1320 may include program instructions 1322, which may be processor-executable to implement any element or action described above. In one embodiment, the program instructions may implement the methods described above. In other embodiments, different elements and data may be included. Note that data may include any data or information described above.

Those skilled in the art will appreciate that computer system 1300 is merely illustrative and is not intended to limit the scope of embodiments. In particular, the computer system and devices may include any combination of hardware or software that can perform the indicated functions, including computers, network devices, Internet appliances, PDAs, wireless phones, pagers, etc. Computer system 1300 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a computer-accessible medium separate from computer system 1300 may be transmitted to computer system 1300 via transmission media or signals such as electrical, electromagnetic, or digital signals, conveyed via a communication medium such as a network and/or a wireless link. Various embodiments may further include receiving, sending or storing instructions and/or data implemented in accordance with the foregoing description upon a computer-accessible medium. Generally speaking, a computer-accessible medium may include a non-transitory, computer-readable storage medium or memory medium such as magnetic or optical media, e.g., disk or DVD/CD-ROM, volatile or non-volatile media such as RAM (e.g. SDRAM, DDR, RDRAM, SRAM, etc.), ROM, etc. In some embodiments, a computer-accessible medium may include transmission media or signals such as electrical, electromagnetic, or digital signals, conveyed via a communication medium such as network and/or a wireless link The methods described herein may be implemented in software, hardware, or a combination thereof, in different embodiments. In addition, the order of the blocks of the methods may be changed, and various elements may be added, reordered, combined, omitted, modified, etc. Various modifications and changes may be made as would be obvious to a person skilled in the art having the benefit of this disclosure. The various embodiments described herein are meant to be illustrative and not limiting. Many variations, modifications, additions, and improvements are possible. Accordingly, plural instances may be provided for components described herein as a single instance. Boundaries between various components, operations and data stores are somewhat arbitrary, and particular operations are illustrated in the context of specific illustrative configurations. Other allocations of functionality are envisioned and may fall within the scope of claims that follow. Finally, structures and functionality presented as discrete components in the example configurations may be implemented as a combined structure or component. These and other variations, modifications, additions, and improvements may fall within the scope of embodiments as defined in the claims that follow.

What is claimed is:

1. A non-transitory computer-readable medium storing program instructions that, when executed by one or more processors, cause the one or more processors to:
   compress attribute data for a plurality of points of a point cloud at a first moment in time and at one or more additional moments in time,
   wherein to compress the attribute data at the first moment in time, the program instructions cause the one or more processors to:
      apply an intra-prediction process at the first moment in time to predict attribute values of the plurality of points at the first moment in time based on predicted or assigned attribute values of neighboring points at the first moment in time;
      determine residual differences between the predicted attribute values and actual attribute values of the point cloud at the first moment in time; and
      encode the determined residual differences for the point cloud at the first moment in time,
   wherein to compress the attribute data at the one or more additional moments in time, the program instructions cause the one or more processors to:
      apply an inter-prediction process at the one or more additional moments in time, wherein to perform the inter-prediction process, the program instructions cause the one or more processors to:
         segment the point cloud at the first moment in time into a plurality of segments, each segment comprising one or more points of the point cloud in 3D space;
         determine motion compensation functions to apply to the segments at the first moment in time to model motion of the points included in the segments at the first moment in time to a target moment in time at one of the one or more additional moments in time;
         determine differences between locations of the points determined using the motion compensation functions and actual locations of the points of the point cloud at the target moment in time;
         further segment one or more of the segments, determine motion compensation functions for the further segmented one or more segments, and determine location differences for points of the further segmented one or more segments,
   wherein in response to determining that further segmentation of the segments or further segmented segments of the point cloud does not improve compression efficiency of the inter-prediction process or reduce distortion of the inter-prediction process by more than one or more threshold amounts, wherein the improved compression efficiency or the reduced distortion is based on the further segmentation further reducing the location differences for the points of the further segmented one or more segments, the program instructions cause the one or more processors to:
      encode the determined motion compensation functions for the segments and further segmented segments of the point cloud.

2. The non-transitory computer-readable medium of claim 1, wherein the program instructions further cause the one or more processors to:
   predict attribute values of points of the point cloud at the target moment in time after applying the determined motion compensation functions, wherein the prediction is performed using an intra prediction process using motion compensated points at the target moment in time;
   determine residual differences between the predicted attribute values of the motion compensated points at the target moment in time and actual attribute values of the points of the point cloud at the target moment in time; and
   encode the determined residual differences for the target moment in time.

3. The non-transitory computer-readable medium of claim 1, wherein the program instructions cause the one or more processors to:
   organize the points of each segment according to an order based on a space filling curve; and
   encode the residual differences for the points of the respective segments in an order according to the space filling curve order.

4. The non-transitory computer-readable medium of claim 1, wherein the program instructions cause the one or more processors to:
   organize the points of the point cloud into an octree, wherein a further segment of a segment is an octant of a parent octant of the octree.

5. The non-transitory computer-readable medium of claim 1, wherein the motion compensation functions comprise one or more of:
   a rigid-motion transform function;
   an affine-motion transform function; or
   an elastic-motion transform function.

6. The non-transitory computer-readable medium of claim 5, wherein the program instructions cause the one or more processors to:
   select a first motion compensation function to be applied to a first segment to model motion of the first segment from the first moment in time to the target moment in time; and
   select a second motion compensation function to be applied to a second segment to model motion of the second segment from the first moment in time to the target moment in time, wherein the selected first motion compensation function and the selected second motion compensation function are different motion compensation functions applied to estimate respective motions of different segments of the point cloud over a same time period.

7. The non-transitory computer-readable medium of claim 1, wherein the one or more thresholds are determined based on a rate distortion optimization (RDO) calculation, wherein the RDO calculation optimizes a number of bits required to encode additional motion compensation functions for additional segments of the point cloud and a level of distortion reduction that would result from further segmenting the point cloud and encoding additional motion compensation functions for the additional segments.

8. The non-transitory computer-readable medium of claim 1, wherein the program instructions further cause the one or more processors to:
  determine, at a segment-level, based on a rate distortion optimization whether to:
    encode residual differences for attribute values for points of a given segment according to the intra-prediction process; or
    encode a motion compensation function for the given segment according to the inter-prediction process.

9. The non-transitory computer-readable medium of claim 1, wherein to encode the determined motion compensation functions for the segments and further segmented segments of the point cloud, the program instructions cause the one or more processors to:
  predict motion compensation functions for segments at a same level of segmentation based on motion compensation functions predicted or assigned to neighboring segments at the same level of segmentation;
  determine differences between the predicted motion compensation functions and the determined motion compensation functions for the segments at the same level of segmentation; and
  encode correction values to adjust the predicted motion compensation functions to approximate the determined motion compensation functions, wherein a decoder utilizes a similar prediction strategy to predict similar motion compensation functions and applies the correction values to adjust the predicted motion compensation functions to approximate the motion compensation functions determined at an encoder.

10. A device, comprising:
  a memory storing program instructions for implementing an inter-prediction process for compressing point cloud data for a point cloud across multiple moments in time, wherein the point cloud comprises a plurality of points in 3D space; and
  one or more processors, wherein the program instructions, when executed by the one or more processors, cause the one or more processors to:
    segment a point cloud at a first moment in time into a plurality of segments, each segment comprising one or more points of the point cloud in 3D space;
    determine motion compensation functions to apply to the segments at the first moment in time to model motion of the points included in the segments at the first moment in time to a target moment in time;
    determine differences between locations of the points determined using the motion compensation functions and actual locations of the points of the point cloud at the target moment in time;
    further segment one or more of the segments, determine motion compensation functions for the further segmented one or more segments, and determine location differences for points of the further segmented one or more segments; and
    encode the determined motion compensation functions for the segments and further segmented segments of the point cloud, in response to determining that further segmentation does not improve compression efficiency or reduce distortion by more than one or more threshold amounts wherein the improved compression efficiency or the reduced distortion is based on further segmentation further reducing the location differences for the points of the further segmented one or more segments.

11. The device of claim 10, further comprising:
  one or more sensors configured to capture spatial information and attribute information for the plurality of points of the point cloud,
  wherein the program instructions, when executed by the one or more processors, cause the one or more processors to:
    compress attribute data for the plurality of points of the point cloud at the first moment in time according to an intra-prediction process; and
    compress attribute data for the plurality of points of the point cloud at the target moment in time according to an inter-prediction process using the encoded determined motion compensation functions.

12. The device of claim 11, wherein to compress the attribute data for the plurality of points of the point cloud at the target moment in time according to the inter-prediction process, the program instructions, when executed by the one or more processors, cause the one or more processors to:
  predict attribute values of points of the point cloud at the target moment in time after applying the determined motion compensation functions, wherein the prediction is performed using motion compensated points at the target moment in time;
  determine residual differences between the predicted attribute values of the motion compensated points at the target moment in time and captured attribute values of the points of the point cloud at the target moment in time; and
  encode the determined residual differences for the target moment in time.

13. The device of claim 10, wherein the program instructions, when executed by the one or more processors, cause the one or more processors to:
  determine, at each of a plurality of moments in time, based on a rate distortion optimization (RDO) calculation whether to:
    compress attribute values of the point cloud according to an intra-prediction process at the given moment in time; or
    compress attribute values of the point cloud according to an inter-prediction process at the given moment in time.

14. The device of claim 13, wherein the RDO calculation optimizes a number of bits required to encode additional motion compensation functions for additional segments of the point cloud and a level of distortion reduction that would result from further segmenting the point cloud and encoding additional motion compensation functions for the additional segments.

15. The device of claim 14, wherein the level of distortion reduction used in the RDO calculation is based on geometrical distortion of the point cloud.

16. The device of claim 14, wherein the level of distortion reduction used in the RDO calculation is based on attribute value distortion or texture distortion of the point cloud.

17. The device of claim 10, wherein the program instructions, when executed by the one or more processors, further cause the one or more processors to:
for versions of the point cloud at different moments in time that include a different number of points:
determine a mapping between a given point at a given moment in time and two or more points that correspond to the given point at another moment in time; and
encode data indicating the mapping.

18. A non-transitory computer-readable medium storing program instructions that, when executed by one or more processors, cause the one or more processors to:
receive data indicating correction values for adjusting predicted motion compensation functions to approximate motion compensation functions determined at an encoder for segments of a point cloud;
predict motion compensation functions for segments of the point cloud to estimate motion between a reference point in time and a target point in time;
apply the correction values to adjust the predicted motion compensation functions to approximate the motion compensation functions determined at the encoder;
apply the corrected motion compensation functions to corresponding segments of the point cloud at the reference point in time to estimate locations of the segments at the target point in time, wherein at least some of the segments are larger than other ones of the segments; and
predict attribute values for points of the point cloud included in the segments at the target point in time based on the estimated locations of the points at the target point in time.

19. The non-transitory computer-readable medium of claim 18, wherein the program instructions, when executed by the one or more processors, cause the one or more processors to:
receive data indicating residual attribute differences for the target point in time; and
apply the residual attribute differences to the predicted attribute values for the points of the point cloud at the target point in time to adjust the predicted attribute values to approximate captured or generated attribute values for the point cloud at the target point in time.

* * * * *